United States Patent
Aarre

(10) Patent No.: US 11,054,537 B2
(45) Date of Patent: Jul. 6, 2021

(54) FEATURE INDEX-BASED FEATURE DETECTION

(71) Applicant: Schlumberger Technology Corporation, Sugar Land, TX (US)

(72) Inventor: Victor Aarre, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 255 days.

(21) Appl. No.: 16/065,115

(22) PCT Filed: Jan. 26, 2017

(86) PCT No.: PCT/US2017/015000
§ 371 (c)(1),
(2) Date: Jun. 21, 2018

(87) PCT Pub. No.: WO2017/132294
PCT Pub. Date: Aug. 3, 2017

(65) Prior Publication Data
US 2019/0011582 A1    Jan. 10, 2019

Related U.S. Application Data

(60) Provisional application No. 62/289,230, filed on Jan. 30, 2016.

(51) Int. Cl.
*G01V 1/30* (2006.01)
*G01V 3/38* (2006.01)
*G01V 5/00* (2006.01)

(52) U.S. Cl.
CPC .............. *G01V 1/302* (2013.01); *G01V 1/306* (2013.01); *G01V 1/307* (2013.01); *G01V 3/38* (2013.01);
(Continued)

(58) Field of Classification Search
CPC ............ G01V 2210/642; G01V 1/302; G01V 2210/645; G01V 1/307; G01V 2210/646;
(Continued)

(56) References Cited

U.S. PATENT DOCUMENTS

| 6,594,585 B1 | 7/2003 | Gersztenkorn |
| 2008/0165185 A1 | 7/2008 | Smith et al. |

(Continued)

FOREIGN PATENT DOCUMENTS

| WO | 2013/116844 A1 | 8/2013 |
| WO | 2014/001751 A2 | 1/2014 |

OTHER PUBLICATIONS

Hachmoller, et al., "Integration of surface-based tomographic models for zonation and multimodel guided extrapolation of sparsely know petrophysical parameters," Geophysics, vol. 78, No. 4, Jul. 1, 2013, pp. EN43-EN53.

(Continued)

*Primary Examiner* — Mischita L Henson

(57) ABSTRACT

A method can include receiving n-dimensional data where n is equal at least three; analyzing a plurality of two-dimensional slices of the n-dimensional data to determine characteristic information with respect to a plurality of feature indexes for a feature in the n-dimensional data; and, based at least in part on the characteristic information, associating the feature with one of the feature indexes.

20 Claims, 29 Drawing Sheets

(52) U.S. Cl.
CPC ............ *G01V 5/00* (2013.01); *G01V 2210/48* (2013.01); *G01V 2210/63* (2013.01); *G01V 2210/641* (2013.01); *G01V 2210/642* (2013.01); *G01V 2210/645* (2013.01); *G01V 2210/646* (2013.01)

(58) Field of Classification Search
CPC ...... G01V 1/306; G01V 2210/48; G01V 3/38; G01V 2210/641; G01V 5/00; G01V 2210/63
See application file for complete search history.

(56) References Cited

U.S. PATENT DOCUMENTS

| | | | |
|---|---|---|---|
| 2012/0261135 A1* | 10/2012 | Nowak | G01V 1/301 166/369 |
| 2015/0073715 A1* | 3/2015 | Aarre | G01V 1/345 702/14 |
| 2015/0355353 A1 | 12/2015 | Whitaker et al. | |
| 2016/0003973 A1 | 1/2016 | Guner et al. | |

OTHER PUBLICATIONS

International Preliminary Report on Patentability for the equivalent International patent application PCT/US2017/015000 dated Aug. 9, 2018.
Extended Search Report for the equivalent European patent application 17744856.0 dated Mar. 20, 2019.
Bayramoglu, et al., "Shape index SIFT: Range image recognition using local features," The 20th International Conference on Pattern Recognition, 2010.
Chopra, et al., "Structural Curvature versus Amplitude Curvature," Presented at AAPG Annual Conventional and Exhibition, Long Beach, California, Apr. 22-25, 2012.
Roberts, "Curvature attributes and their application to 3D interpreted horizons," First Break, Dec. 21, 2001, Issue 12, vol. 19, pp. 85-100.
International Search Report and Written Opinion for the equivalent International patent application PCT/US2017/015000 dated Apr. 28, 2017.
Communication pursuant to Article 94(3) for European patent application 17744856.0 dated Nov. 13, 2019.

* cited by examiner

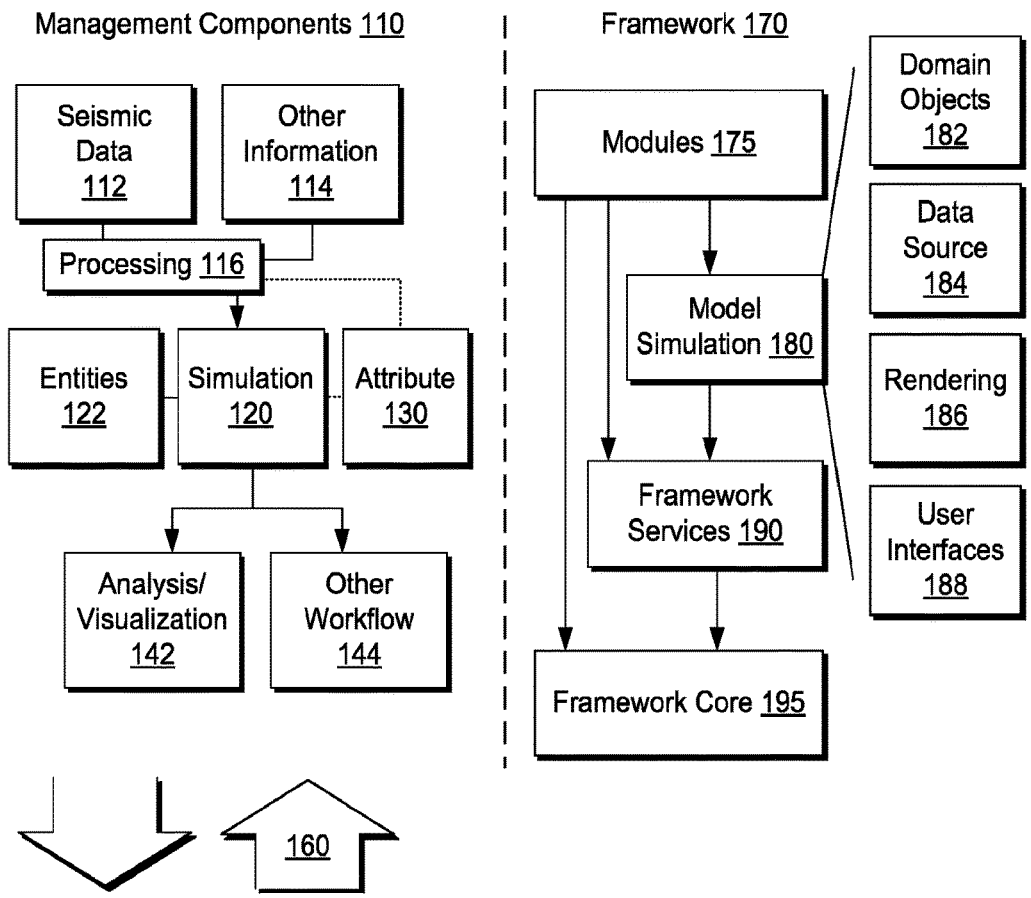
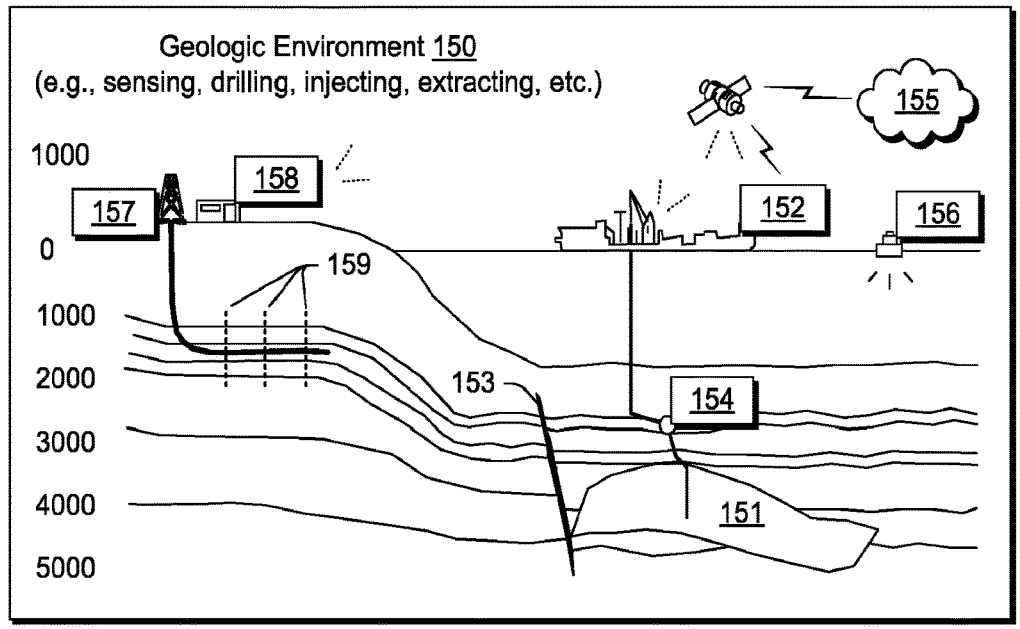
Fig. 1

800
$$K = d\omega / dS = 2\pi / 2\pi R = 1 / R$$
$$K = \frac{d^2y/dx^2}{(1+(dy/dx)^2)^{3/2}}$$
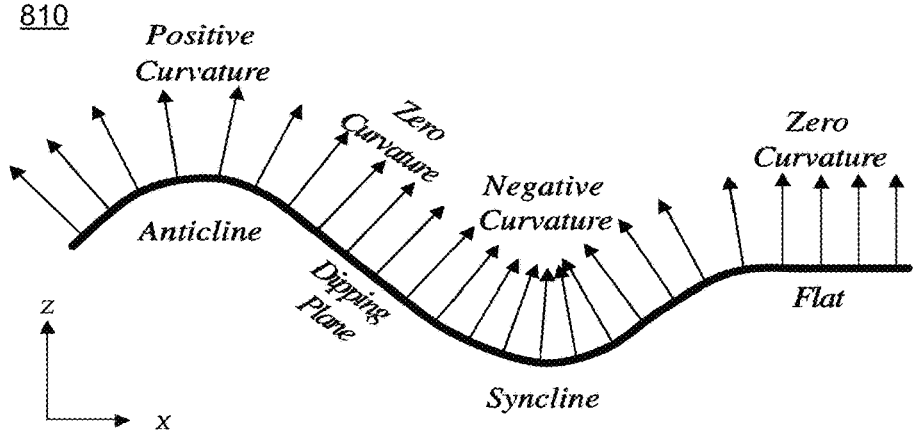
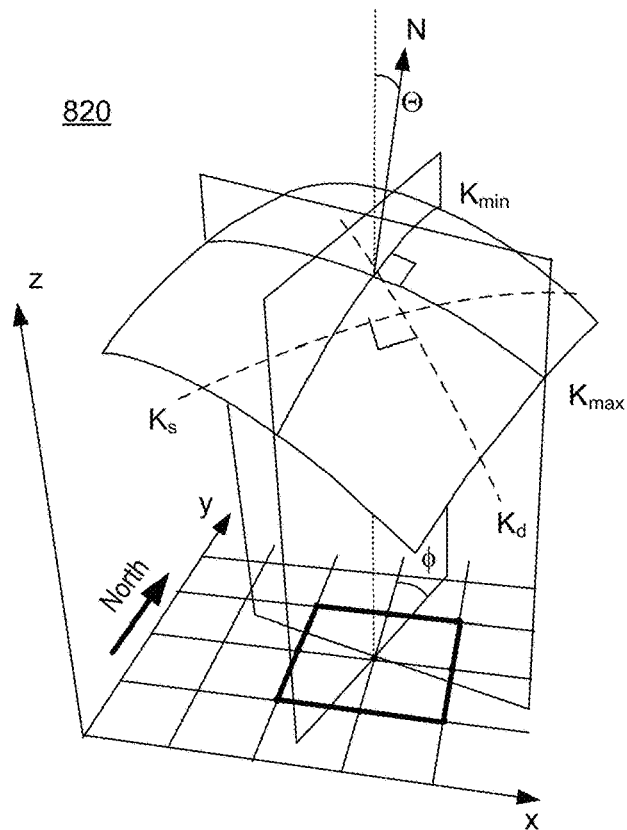
Fig. 8

$$y = ax^2 + by^2 + cxy + dx + ey + f$$

$$a = \frac{1}{2}\frac{\partial^2 z}{\partial x^2} = \frac{(Z_1+Z_3+Z_4+Z_6+Z_7+Z_9)}{12\Delta x^2} - \frac{(Z_2+Z_5+Z_8)}{6\Delta x^2}$$

$$b = \frac{1}{2}\frac{\partial^2 z}{\partial y^2} = \frac{(Z_1+Z_2+Z_3+Z_7+Z_8+Z_9)}{12\Delta x^2} - \frac{(Z_4+Z_5+Z_6)}{6\Delta x^2}$$

$$c = \frac{\partial^2 z}{\partial x \partial y} = \frac{(Z_3+Z_7-Z_1-Z_9)}{4\Delta x^2}$$

$$d = \frac{\partial z}{\partial x} = \frac{(Z_3+Z_6+Z_9-Z_1-Z_4-Z_7)}{6\Delta x}$$

$$e = \frac{\partial z}{\partial y} = \frac{(Z_1+Z_2+Z_3-Z_7-Z_8-Z_9)}{6\Delta x}$$

$$f = \frac{2(Z_2+Z_4+Z_6+Z_8)-(Z_1+Z_3+Z_7+Z_9)+5Z_5}{9}$$

FIG. 9

Equations:

$$\begin{bmatrix} Z_1 \\ Z_2 \\ \vdots \\ Z_i \\ \vdots \\ Z_m \end{bmatrix}_{[M \times 1]} = \underbrace{\begin{bmatrix} x_1^2 & y_1^2 & x_1 y_1 & x_1 & y_1 & 1 \\ x_2^2 & y_2^2 & x_2 y_2 & x_2 & y_2 & 1 \\ \vdots & \vdots & \vdots & \vdots & \vdots & \vdots \\ x_i^2 & y_i^2 & x_i y_i & x_i & y_i & 1 \\ \vdots & \vdots & \vdots & \vdots & \vdots & \vdots \\ x_m^2 & y_m^2 & x_m y_m & x_m & y_m & 1 \end{bmatrix}}_{A \; [M \times 6]} \times \underbrace{\begin{bmatrix} a \\ b \\ c \\ d \\ e \\ f \end{bmatrix}}_{X \; [6 \times 1]}$$

$Y$

1010

Exact solution:

$A \in [6,6]$ → i.e. $M=6$ $Y = A \cdot X$
$A^{-1} \cdot Y = A^{-1} \cdot A \cdot X$
$X = A^{-1} \cdot Y$ Least-squares solution:

$M > 6:$  $X = \underbrace{(A^T A)^{-1} A^T}_{X = B \cdot Y} \cdot Y$ where:
$B$ is the Moore-Pentrose pseudo-inverse of $A$
$[6 \times m] \times [m \times 1] = [6 \times 1]$

FIG. 10

$M = cnt\_i \times cnt\_x$ $A \in [M.6]$ $A[i,0] = x_i^2$
$A[i,1] = y_i^2$
$A[i,2] = x_i \cdot y_i$
$A[i,3] = x_i$
$A[i,4] = y_i$
$A[i,5] = 1.0$ $$x = \begin{bmatrix} a \\ b \\ c \\ d \\ e \\ f \end{bmatrix} \quad y = \begin{bmatrix} Z_1 \\ Z_2 \\ \vdots \\ Z_i \\ \vdots \\ Z_m \end{bmatrix}$$

1110

<u>Least-squares:</u>

$B = (A^T A)^{-1} A^T$ $X = \underbrace{(A^T A)^{-1} A^T}_{B} \cdot Y$

<u>Exact:</u>

$Y = A \cdot X$

FIG. 11

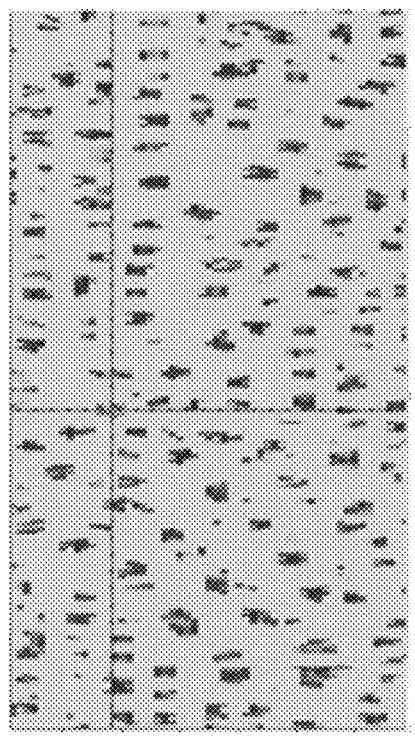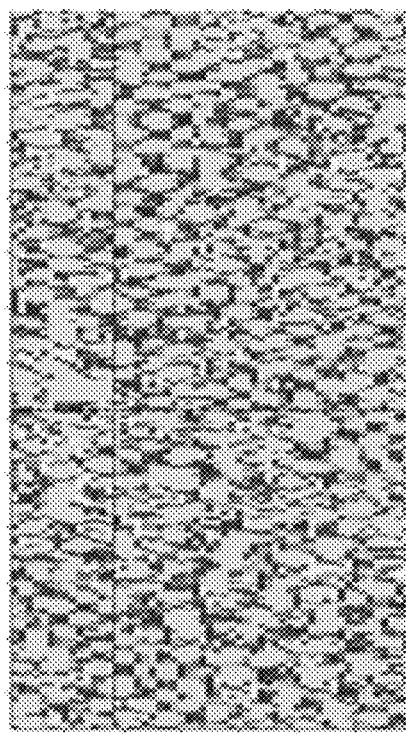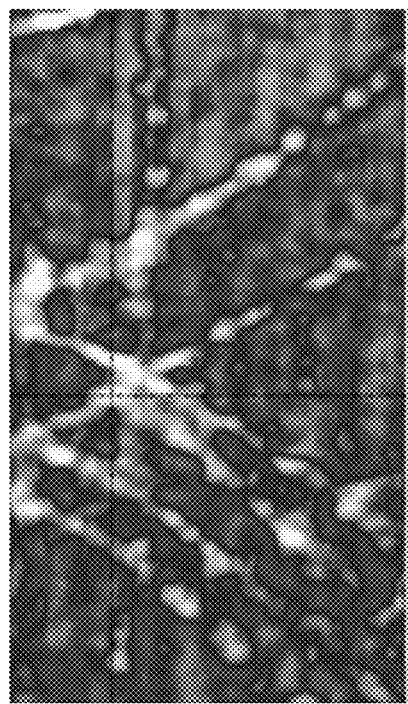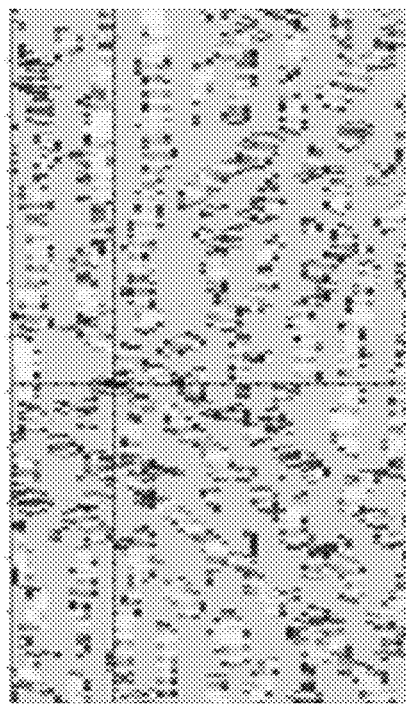
1400
Fig. 14

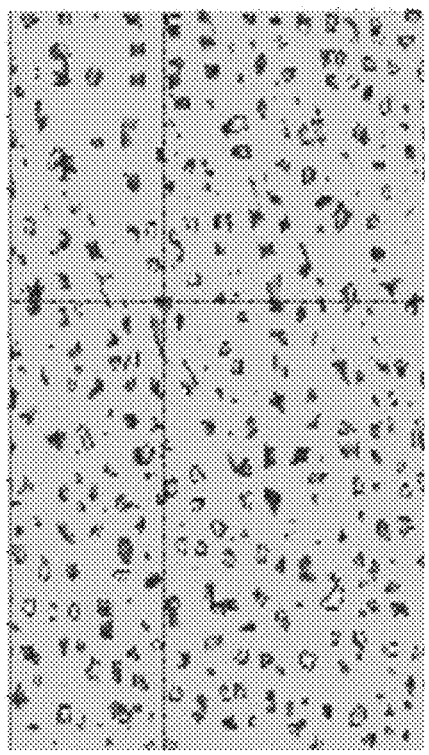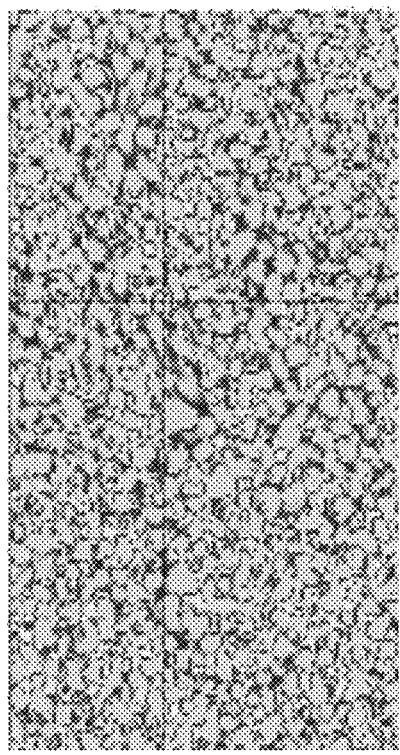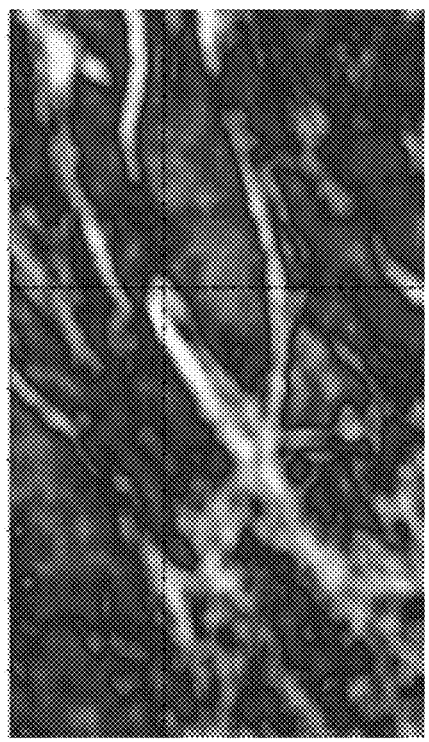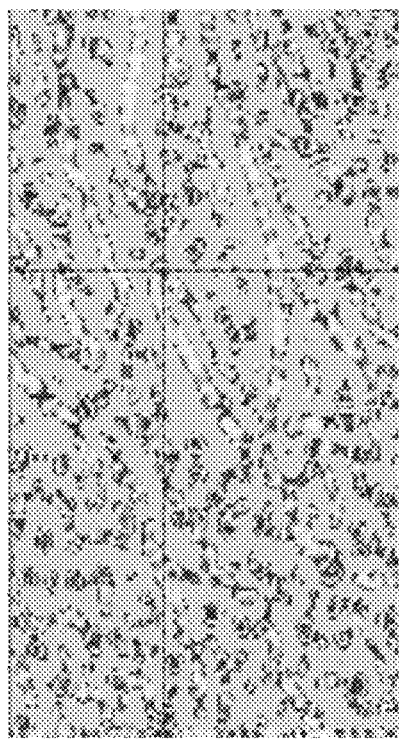
1500
Fig. 15

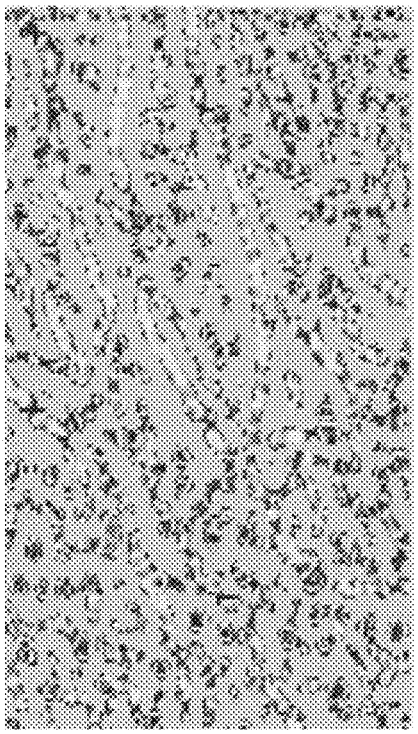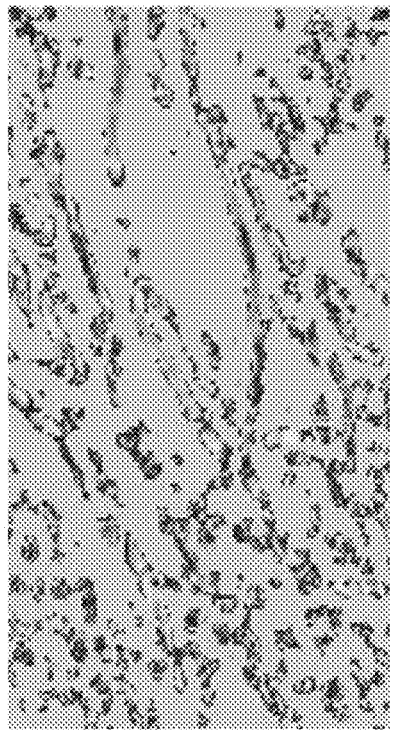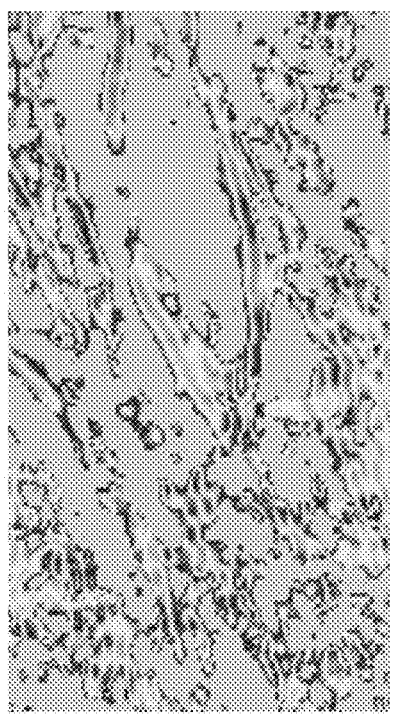
1600
Fig. 16

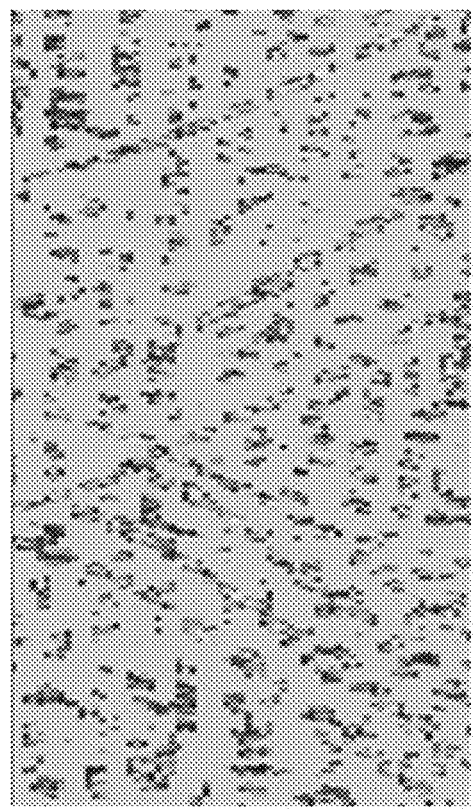
1700
Fig. 17

1800
Fig. 18

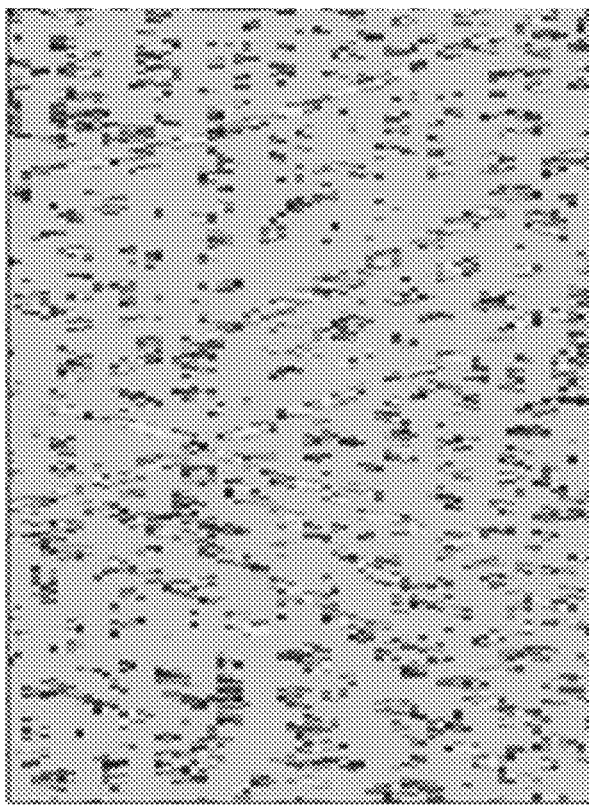
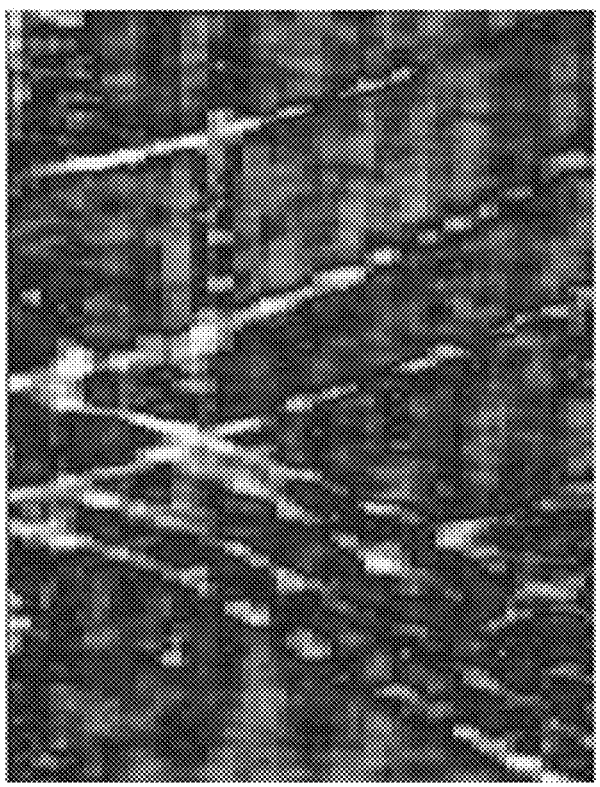
1900
Fig. 19

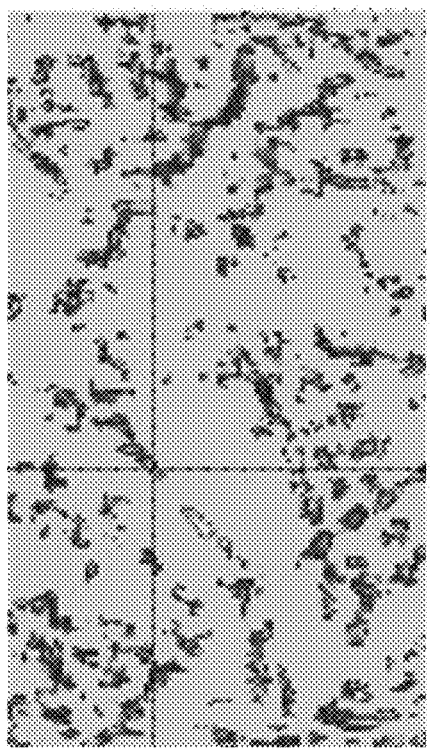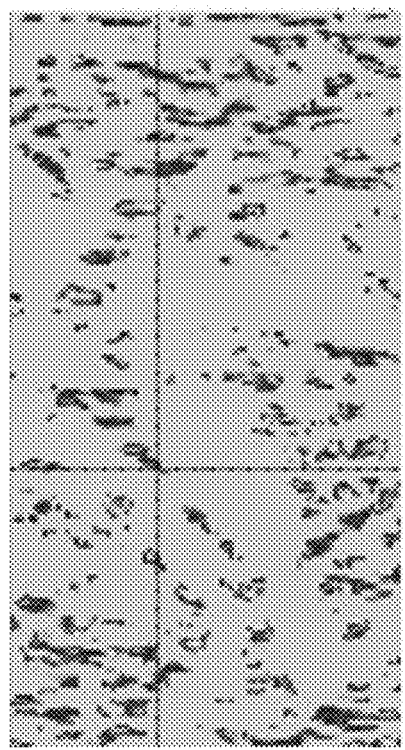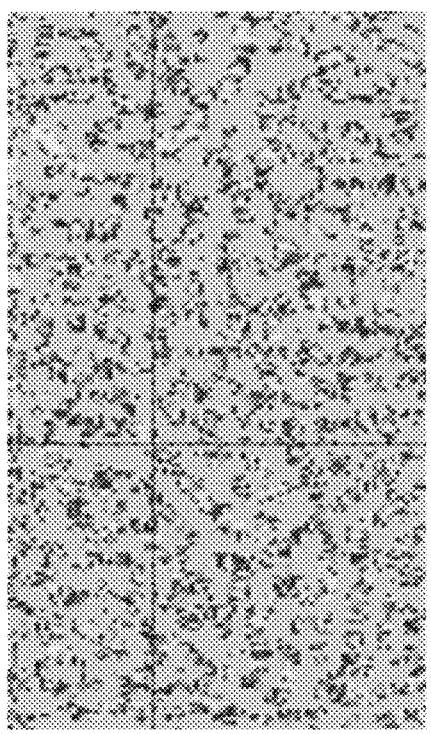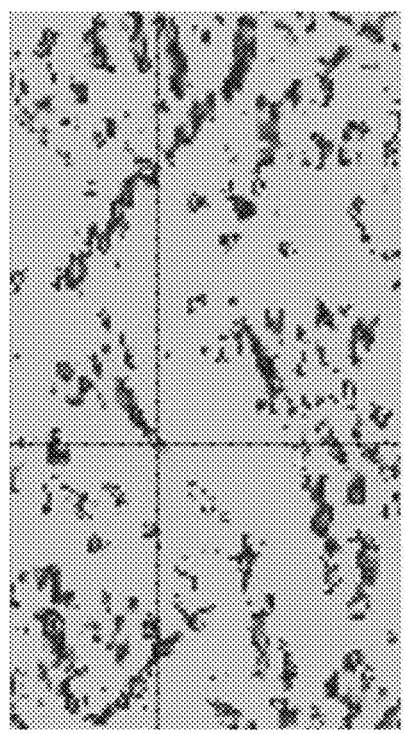
2000
Fig. 20

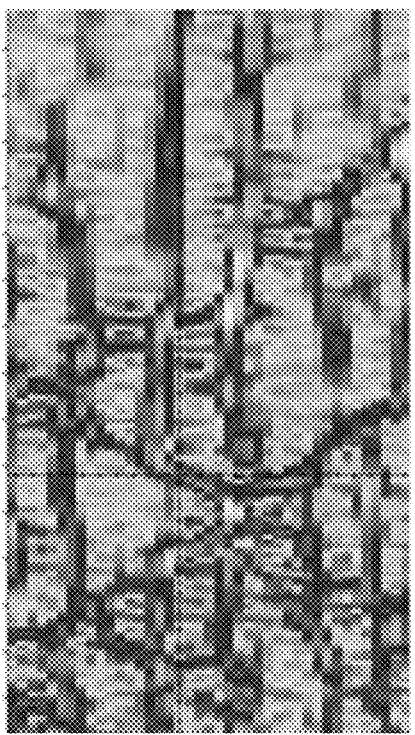
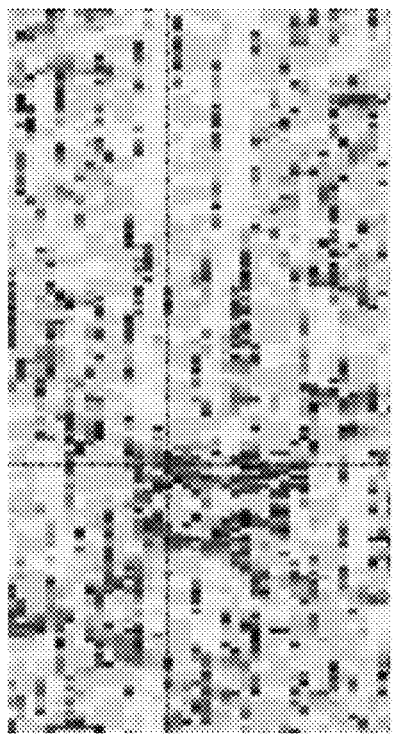
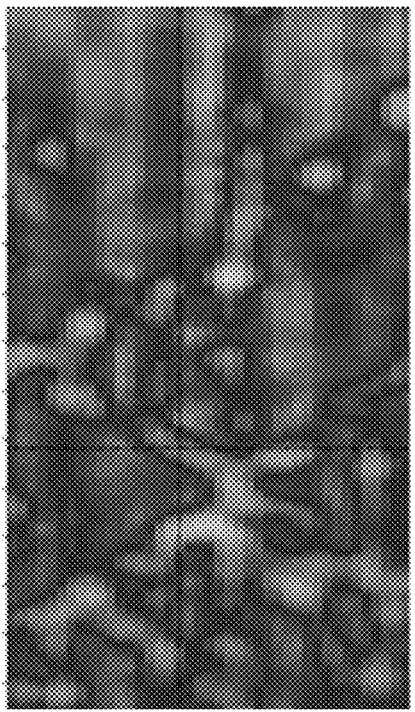
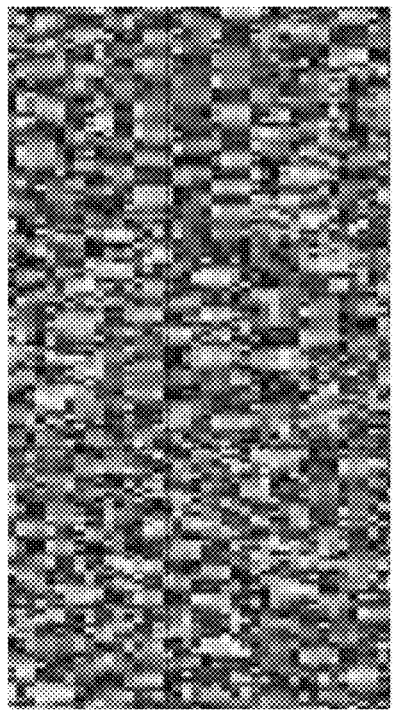
2100
Fig. 21

2200

$$Dip\ Angle = \tan^{-1}\sqrt{(d^2 + e^2)}$$

$$Azimuth = \tan^{-1}\left(\frac{e}{d}\right)$$

$$\tan\theta'_i = \frac{w_1^{\lambda_i}}{w_2^{\lambda_i}} = \frac{\lambda_i - cde + 2b(1 + d^2)}{2ade - c(1 + d^2)}$$

$$\lambda_{1,2} = \frac{cde - a(1 + e^2) - b(1 + d^2) \pm \sqrt{\alpha - \beta}}{(1 + d^2 + e^2)^{\frac{3}{2}}}$$

$$\alpha = \left(a(1 + e^2) - b(1 + d^2)\right)^2$$

$$\beta = \left(2bde - c(1 + e^2)\right)\left(2ade - c(1 + d^2)\right)$$

Consistent Curvature $$y^T = [z_1 z_2 \ldots z_p] \qquad A[i, 1] = x_i^2$$
$$x^T = [a\ b\ c\ d\ e\ f] \qquad A[i, 2] = y_i^2$$

Exact Solution: p = 6

$$A[i, 3] = x_i\ y_i$$
$$y = Ax$$
$$A[i, 4] = x_i$$
$$x = A^{-1}y$$
$$A[i, 5] = y_i$$
$$A[i, 6] = 1.0$$

Least Squares Solution (p > 6)

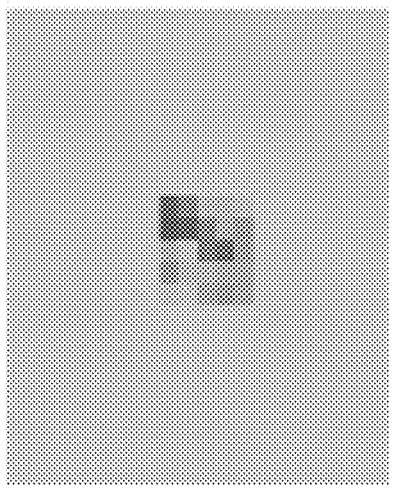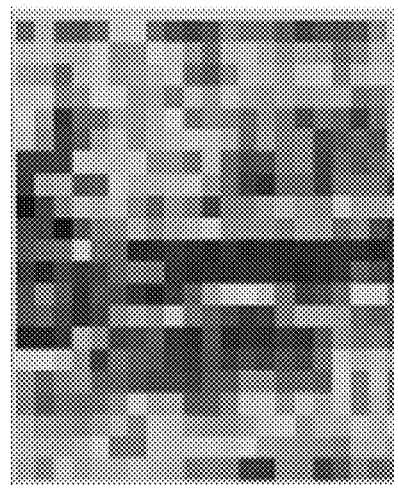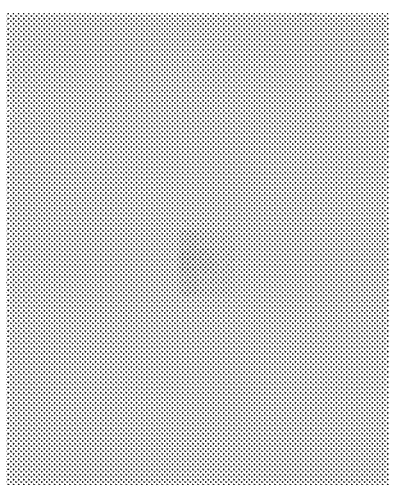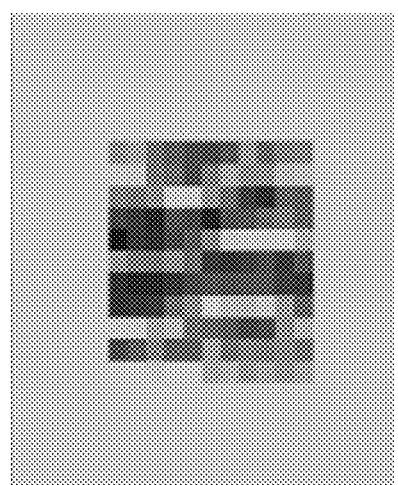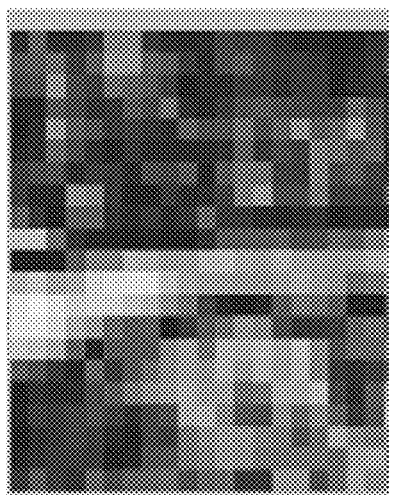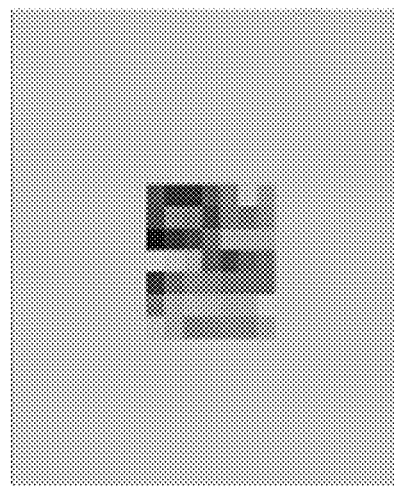
2400
Fig. 24

2500
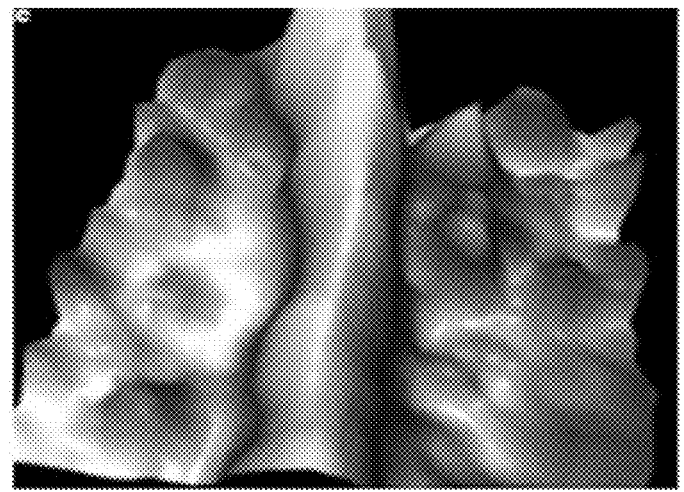
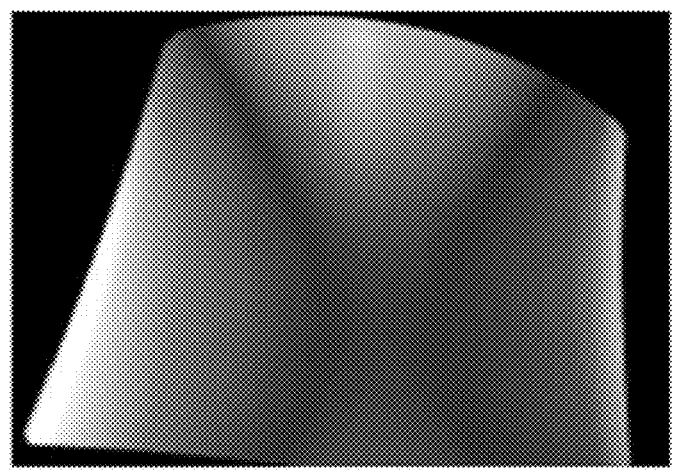
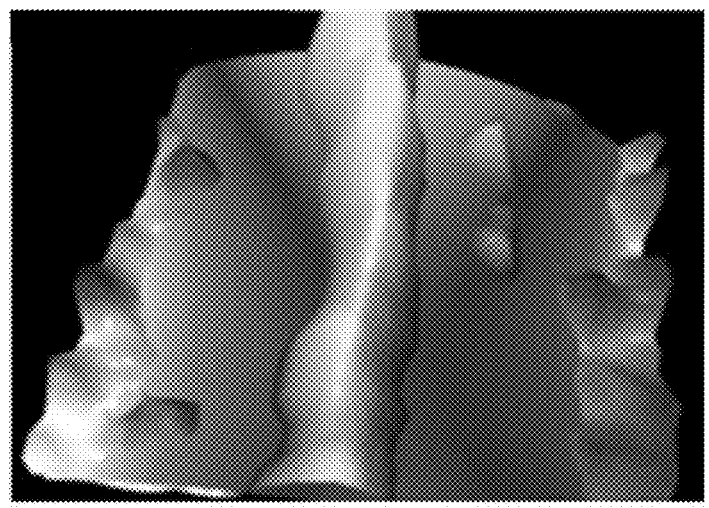
Fig. 25

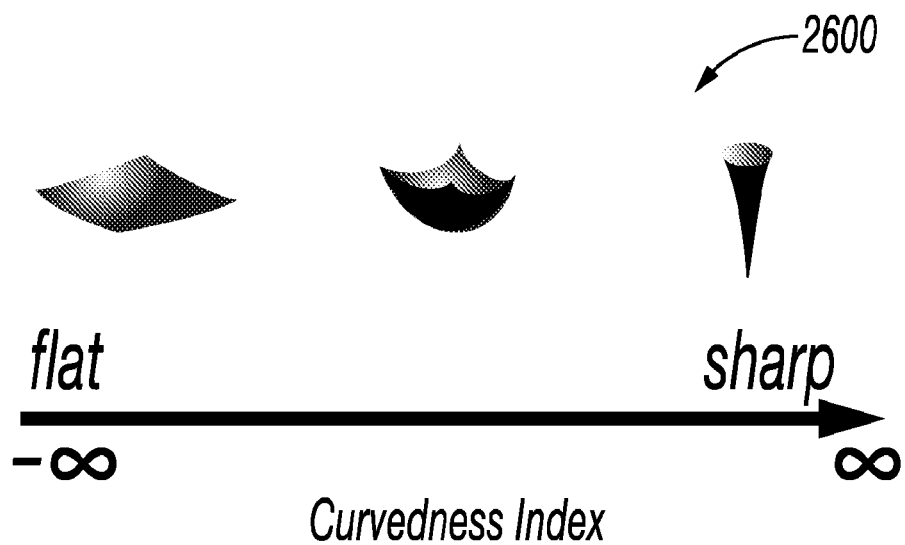
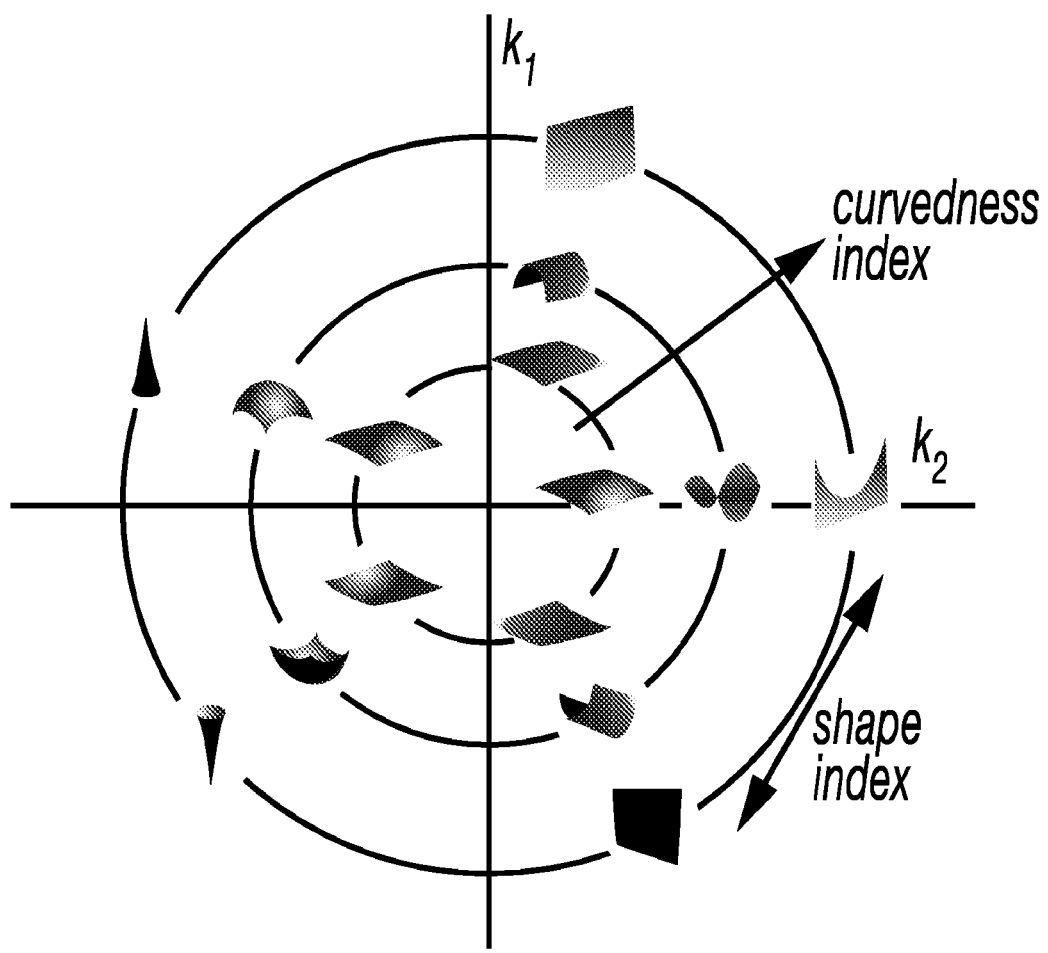
FIG. 26

2800
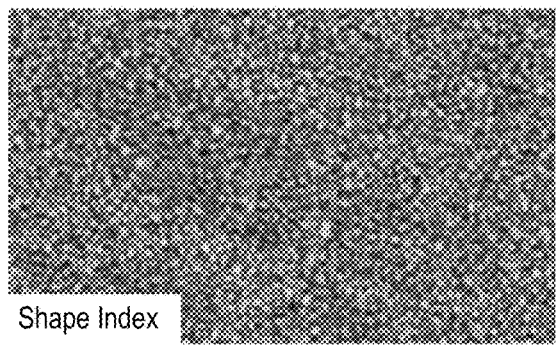
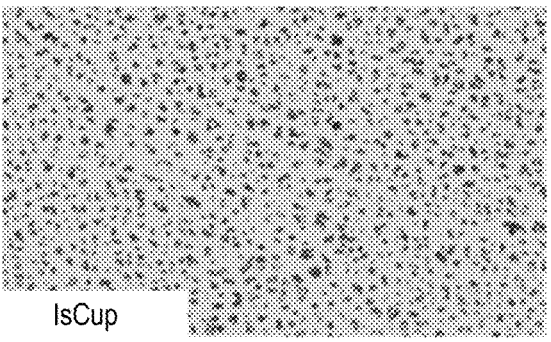
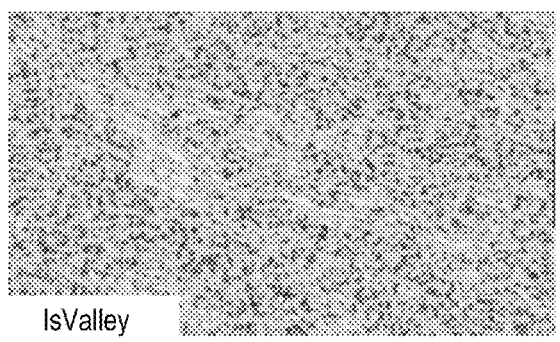
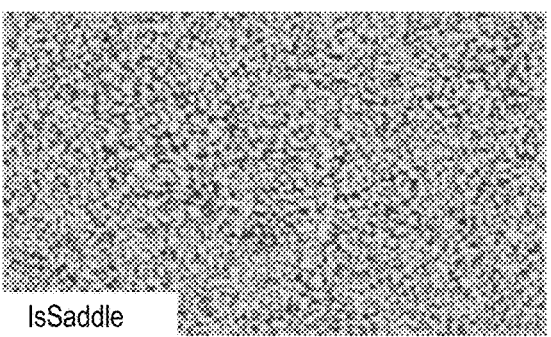
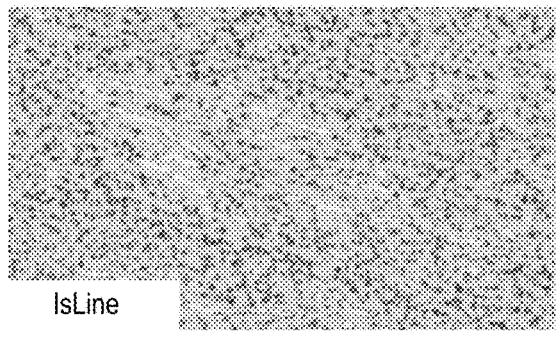
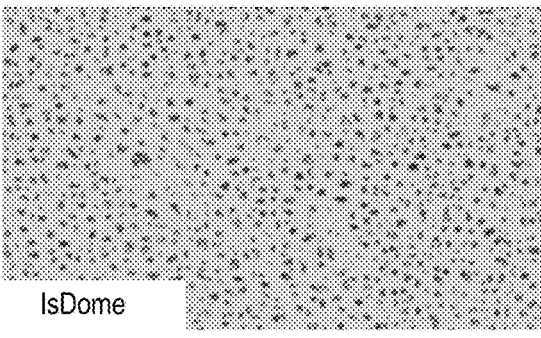
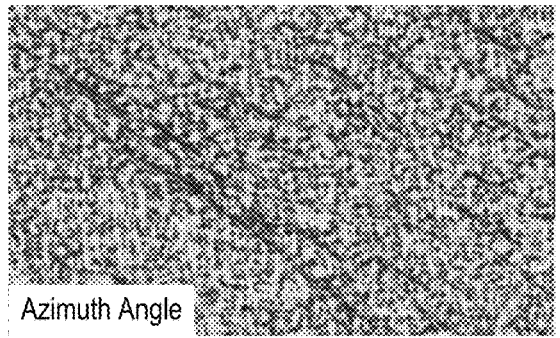
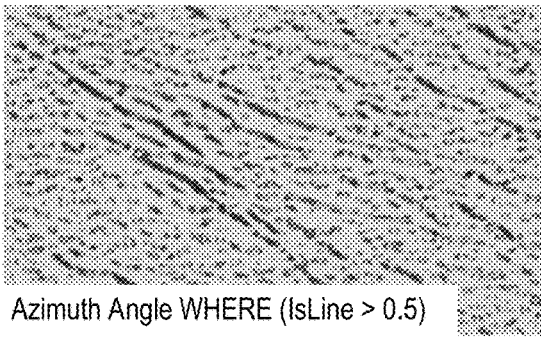
Fig. 28

FEATURE INDEX-BASED FEATURE DETECTION

This application claims priority to U.S. provisional application No. 62/289,230, filed on Jan. 30, 2016, which is incorporated herein by reference in its entirety.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data and/or, for example, one or more other types of data.

SUMMARY

A method can include receiving n-dimensional data where n is equal at least three; analyzing a plurality of two-dimensional slices of the n-dimensional data to determine characteristic information with respect to a plurality of feature indexes for a feature in the n-dimensional data; and, based at least in part on the characteristic information, associating the feature with one of the feature indexes. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example system that includes various components for modeling a geologic environment;

FIG. 8 illustrates examples of equations and examples of plots;

FIG. 9 illustrates examples of equations;

FIG. 10 illustrates examples of equations;

FIG. 11 illustrates examples of equations;

FIG. 14 illustrates an example of a series of plots;

FIG. 15 illustrates an example of a series of plots;

FIG. 16 illustrates an example of a series of plots;

FIG. 17 illustrates an example of a series of plots;

FIG. 18 illustrates an example of a series of plots;

FIG. 19 illustrates an example of a series of plots;

FIG. 20 illustrates an example of a series of plots;

FIG. 21 illustrates an example of a series of plots;

FIG. 22 illustrates examples of equations;

FIG. 24 illustrates an example of a series of plots;

FIG. 25 illustrates an example of a series of plots;

FIG. 26 illustrates an example of a series of plots;

FIG. 28 illustrates an example of a series of plots; and

DETAILED DESCRIPTION

Figure 2:
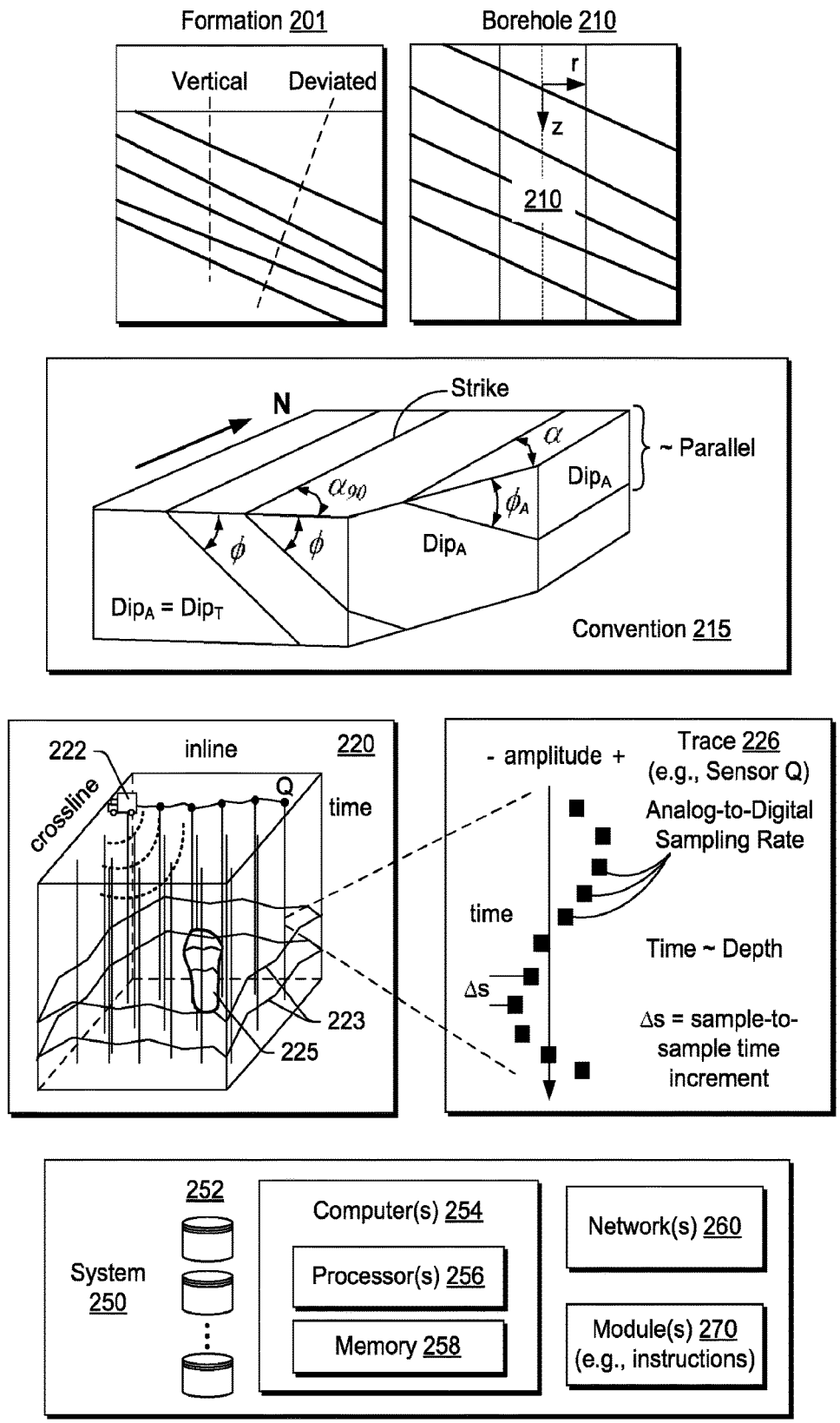
FIG. 2 illustrates examples of formations, an example of a convention for dip, an example of data acquisition, and an example of a system.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a method can include receiving multi-dimensional data and processing at least a portion of the data to detect one or more multi-dimensional features in the data. As an example, the data can be or include seismic data as acquired using equipment deployed in an environment where energy that travels through rock, etc., is detected via sensors. As an example, data can be volumetric data where a volume is a three-dimensional spatial volume. As an example, data can be temporal data, for example, consider volumetric data for a plurality of different times (e.g., 4D seismic data). As an example, data may be or include temperature data, pressure data, flow data, chemical data, etc. As an example, consider processing multi-dimensional temperature data to detect one or more multi-dimensional features and then, for example, analyzing at least one of the one or more features as to structure. For example, a beam or beam-like structure may conduct thermal energy such that temperature data exhibits a characteristic shape; whereas, a plane or plane-like structure may conduct thermal energy such that temperature data exhibits a characteristic shape that differs from that of the beam or beam-like structure. In a geologic environment, associations between physical phenomena and structure may exist such that certain types of data can be processed and associated multi-dimensional features analyzed to determine whether particular structures exist in the geologic environment.

As an example, a framework can include or be implemented using one or more processors. As an example, a computer or computer system may be utilized to receive and process data. As an example, a method may operate automatically, semi-automatically and/or manually.

As to manual operation, a user may utilize an input device (e.g., a mouse, a stylus, a touchscreen, etc.) to select one or more portions of data, to select an algorithm that can process such data and to associate processing result, for example, to construct a multi-dimensional feature. For example, a user may manually select functions for shapes where the functions may be part of a fuzzy logic algorithm that can output results. A user may select particular results, which may be rendered visually to a display, to tie various features together to form a multi-dimensional feature, which may be of a higher dimensionality than the individual features being tied together. For example, consider tying together 2D features to form a 3D feature.

While the foregoing example is described as including manual operations (e.g., selections to instruct a computational framework, etc.), an automated and/or semi-automated approach may tie together various features automatically to output one or more features, which may be of higher dimensionality and/or more complete than the individual features. For example, a user may select data, select a control via a graphical user interface and then wait for output to be generated automatically as to one or more multi-dimensional features in the data. Such an approach may be an automated or semi-automated approach to multi-dimensional feature detection where a feature may be a physical phenomenon (or phenomena) feature and/or a structural feature. As an example, a method can include detecting one type of feature and then associating that type of feature with another type of feature.

As an example, a system can include a processor, memory operatively coupled to the processor and instructions stored in the memory that can be executed by the processor to instruct the system to perform complex reasoning, partitioning and classification of features in multi-dimensional data, which may be multi-dimensional image data (e.g., seismic image data, medical image data, thermal image data, etc.). As an example, where data are or include seismic data, such a system may output results as to one or more of faults, channels, turbidites, chaos zones, salt bodies, etc.

As an example, a method can include receiving n-dimensional data wherein n is equal at least three; analyzing a plurality of two-dimensional slices of the n-dimensional data to determine characteristic information with respect to a plurality of feature indexes for a feature in the n-dimensional data; and, based at least in part on the characteristic information, associating the feature with one of the feature indexes. In such an example, the analyzing can include applying fuzzy logic. As an example, a feature index can be a shape index. As an example, a feature index may be suitable for detection of a feature that is a physical phenomenon feature, a physical phenomena feature and/or a structural feature. A feature index may be for one or more of a shape, an amplitude, a direction/angle, a gradient, etc.

As an example, a feature index can be associated with a corresponding function. For example, a feature index can be associated with a membership function (e.g., or characteristic function). A membership function can be other than a "square" function. For example, fuzzy logic can be an extension of two-valued logic such that statements are not necessarily confined to being true or false, but may have a degree of truth between 0 and 1. A degree of truth can be characteristic information of a membership function associated with a feature index.

A fuzzy set can be defined as a class of objects with a continuum of grades of membership. Such a set can be characterized by a membership (characteristic) function which assigns to each object a grade of membership, for example, ranging between zero and one. The notions of inclusion, union, intersection, complement, relation, convexity, etc., may be extended to such sets, and various properties of these notions in the context of fuzzy sets may be established.

As an example, a membership function of a fuzzy set can be a generalization of an indicator function in classical sets.

In fuzzy logic, for example, a membership function can represent the degree of truth as an extension of valuation. Fuzzy truth can represent membership in "vaguely" defined sets.

As an example, a shape index may be defined using a corresponding index value range. For example, consider a range from about 0 to about 1 or, for example, a range from about −1 to about +1. As an example, shape indexes may be in an order as follows: cup or bowl, rut or valley, saddle, ridge and cap or dome. As an example, a plane may be considered to have an undefined index value.

As an example, curvedness C can be a measure of deformation. For example, consider the following equation:

$$C = +(k_1^2 + k_2^2)^{0.5}$$

where $k_1$ and $k_2$ are the most-positive and the most-negative principal curvatures, with $k_1 \geq k_2$.

As an example, consider a shape index, s, defined as follows:

$$s = \frac{2}{\pi} \text{ATAN}\left(\frac{k_2 + k_1}{k_s \ k_1}\right)$$

As an example, where values of the shape index range between −1.0 and +1.0 with s=−1.0 indicating a bowl or cup, a rut or valley is s=−0.5, a saddle is s=0.0, a ridge is s=+0.5 and a cap or dome is s=+1.0.

As an example, a multi-dimensional surface may be described via one or more of normal vector and curvature. As an example, a point in a multi-dimensional space may be described by its minimum and maximum curvatures (principal curvatures) or, for example, some functions of these principal curvatures ($k_1$, $k_2$) at the point of interest. A shape index along a shape spectrum can be a measure of a feature, a point, etc.

As an example, curvature values on a multi-dimensional surface may be obtained via fitting of a quadric surface to a local patch.

As an example, a property of a shape index can be scale, translation, and rotation invariance. As an example, a shape index can make a strong emphasis on points where surfaces deviate from being smooth, even for relatively small changes.

As an example, a method may employ a Scale Invariant Feature Transform (SIFT) approach. SIFT is an invariant 2D local descriptor which is robust to some specific transformations. SIFT can include, for example scale space construction, keypoint detection, and feature extraction. As an example, a scale space can be constructed by taking the difference of the Gaussian (DoG) blurred images at different scales. Next, keypoints can be detected as the local extremum of the DoG images across scales. As an example, a gradient orientation histogram can be computed in the neighborhood of a keypoint as a feature vector.

As an example, a method may employ segmentation. As an example, a method may operate globally and/or locally. As an example, a method may operate locally, for example, without operating globally. As an example, a method may operate at least in part in a reduced dimensional space. For example, where data are in a three-dimensional space, a method may operate in two-dimensional spaces within that three-dimensional space (e.g., consider slices of a volume). In such an example, data can be valued, which may be akin to image pixel and/or voxel values. As an example, a value may represent a physical structure or a physical phenomenon (e.g., temperature or pressure) or phenomena (e.g., a combination of temperature and pressure). As an example, a value may represent a combination of structure and phenomenon or phenomena. As an example, a method may operate locally and then globally. For example, a method may operate on two-dimensional slices of a volume and then tie together information from such operations to detect a higher dimensional feature (e.g., a three-dimensional feature).

As an example, a feature may be a feature selected from a group of chemical features, structural features, electromagnetic features, temperature features, and fluid features.

As an example, a method may include filtering. As an example, a method can include filtering and feature detection.

In various example embodiments, one or more filters may be applied to attenuate seismic noise. Such an approach may be part of a workflow such as, for example, an interpretation workflow that operates on data such as seismic data, data derived from seismic data, etc.

As an example, a method may include analyzing seismic data to detect features such as horizons, fractures, other structures, etc. As an example, seismic analyses may be implemented in a framework as a module, set of modules, etc.

Where seismic data may include noise at a level to be considered "noisy", an analysis or analyses may include filtering. As an example, one or more analyses may be performed to assist with detection of one or more features of interest in oil and gas exploration and production (E&P). For example, results from an analysis may assist with well placement, geologic modeling, sill analyses, detection of fractured zones or fracture corridors, and in E&P for unconventional resources and carbonate fields (e.g., consider shale fields).

As an example, filter may aim to efficiently attenuate one or more types of noise that may exist in seismic data, processed seismic data, etc. As an example, a filtering technique may be applied to 3D seismic images optionally without dip-steering of a filter. In such an example, the filtering technique may provide an ability to calculate various shape and curvature attributes from a 3D seismic image, in addition to one or more curvature attributes (e.g., as may be calculated from one or more structural attributes). As an example, an approach may provide for an ability to decompose a 3D seismic image into separate architectural elements, for example, based on one or more of calculated shape, direction and curvature attribute(s). As an example, a filtering technique may provide for an ability to perform analytics between 3D seismic data and one or more types of measurements (e.g. wireline measurements, etc.).

As an example, a filtering technique may employ fitting of a parametric function to data (e.g., seismic data, data derived from seismic data, etc.) to first attenuate noise, and then calculate one or more attributes based on the parametric function. As an example, a least-squares fitting may be employed to generate a parametric function.

As an example, a method can include implementing a low-pass filter that can act to smooth data. For example, consider a Savitzky-Golay filter (S-G filter). As an example, a S-G filter may be implemented as a digital filter that can be applied to a set of digital data points for the purpose of smoothing the data, that is, to increase the signal-to-noise ratio without substantially distorting the signal.

As an example, a method can include convolution, for example, performed via fitting successive sub-sets of adjacent data points with a low-degree polynomial by a linear least-squares approach. In such an example, when the data points are approximately equally spaced, an analytical solution to least-squares equations may be determined, for example, in the form of a single set of "convolution coefficients" that can be applied to a plurality of data sub-sets, to give estimates of a smoothed signal, (e.g., or derivatives of the smoothed signal) at a central point of each data sub-set to which it is applied. As an example, a S-G filter may be applied to multidimensional data (e.g., 2D data, 3D data, etc.).

Fracture corridors or faults may give rise to seismic signals that may be exhibited in acquired seismic data, for example, in cross sections and as lineaments on slices or seismic surfaces. Detection of such features may include processing seismic signals, seismic data or both to generate one or more edge detection attributes, for example, where an attribute may be considered a measurable "property" of seismic data (e.g., consider amplitude, dip, frequency, phase, polarity, etc.). For example, an attribute may be a value or a set of values derived from seismic signals, seismic data, etc. and defined with respect to a coordinate system (e.g., one-dimensional, two-dimensional, three-dimensional, four-dimensional or of an even higher dimension). As an example, a dimension may be a spatial dimension, a time dimension, a frequency dimension, etc. As an example, consider providing seismic data as a "cube" where each voxel (volume element) in the cube has a value. In such an example, an edge detection algorithm may process the values in a cube to generate new values where the new values are referred to collectively as an edge detection attribute (e.g., an attribute cube).

As an example, a seismic cube (e.g., a seismic volume or seismic data for a volume) may be processed to generate an attribute cube (e.g., an attribute volume or attribute values for a volume). As another example, a seismic surface may be processed to generate an attribute surface. As yet another example, a seismic line may be processed to generate an attribute line. As an example, a seismic point may be processed to generate an attribute point.

Attributes may be derived, measured, etc., for example, at one instant in time, for multiple instances in time, over a time window, etc. and, for example, may be measured on a single trace, on a set of traces, on a surface interpreted from seismic data, etc. Attribute analysis may include assessment of various parameters, for example, as to a reservoir, consider a hydrocarbon indicator derived from an amplitude variation with offset (AVO) analysis.

As to structure detection in a seismic cube, on a seismic reflection surface, etc., various techniques have been applied such as those including local angle and azimuth angle; minimum, maximum, and Gaussian curvature; coherence; 3D curvatures; and spectral decomposition. Various techniques tend to be sensitive to noise in seismic data, acquisition footprint in seismic data or both noise and acquisition footprint in seismic data. While filtering or smoothing may be applied in an effort to eliminate noise and acquisition footprints in seismic data and to obtain more useful information about faults and fractures, such filtering or smoothing may suppress noise and acquisition footprints that include useful information (e.g., about latent structures, etc.). In other words, filtering, smoothing, etc. of seismic data may "remove" or "diminish" small seismic data features (e.g., small in time, space or both time and space) that may be associated with faults, fractures, etc. (e.g., small seismic data features associated with seismic energy interacting with faults, fractures, etc.).

As to noise, it may arise from unwanted seismic energy, such as shot generation ground roll, surface waves, multiples, effects of weather, random occurrences in the Earth, seismology equipment, etc. Noise may exist as coherent noise, incoherent noise or other type of noise. As an example, coherent noise may appear as undesirable seismic energy artifacts with somewhat consistent phase from seismic trace to seismic trace (e.g., consider ground roll and multiples). As an example, incoherent noise, including random noise, may appear as disturbances in seismic data that lack coherence (e.g., lack a phase relationship between adjacent traces).

As to acquisition footprint, a footprint may refer to a region for which seismic data are acquired while an "acquisition footprint" may refer to artifacts that result from equipment, techniques, etc. used to acquire the seismic data. For example, for a region at sea, a footprint may be covered by an array of streamers towed by a vessel or vessels. In such an example, the spacing between streamers may be evidenced in seismic data as an acquisition footprint. For example, an acquisition footprint may appear as variations in properties of seismic data (e.g., encountered during processing) that are related to acquisition geometry and that may distort amplitude and phase of reflections.

As an example, consider seismic data where information about a structure (e.g., a fault, a fracture, etc.) exists within the data as high-frequency features in cross sections and as lineaments in slices or in seismic surfaces, which may lack coherence (e.g., to varying degree depending on one or more factors). As noise may include high-frequency characteristics and as information for acquisition footprint may exist as high-frequency artifacts within seismic data, approaches that aim to reduce the impact of noise and acquisition footprint within seismic data may also strip out at least a portion of the high-frequency features within the seismic data that are associated with a latent structure or latent structures.

As an example, a method may include accessing or providing wellbore information. As an example, fault and fracture auto tracking technology such as ant-tracking may be applied to one or more selected slices and/or cubes, for example, to improve or enhance information (e.g., consider ant-tracking to generate a fracture image). As an example, detecting may include classifying, for example, where classification information (e.g., model information, results from previously analyzed data, etc.) may assist in detecting one or more features that may belong to a class of features (e.g., a type of feature).

Below, an example of a system is described followed by various technologies, including examples of techniques, which may, for example, include filtering, etc.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

FIG. 2 shows an example of a formation 201, an example of a borehole 210, an example of a convention 215 for dip, an example of a data acquisition process 220, and an example of a system 250.

As shown, the formation 201 includes a horizontal surface and various subsurface layers. As an example, a borehole may be vertical. As another example, a borehole may be deviated. In the example of FIG. 2, the borehole 210 may be considered a vertical borehole, for example, where the z-axis extends downwardly normal to the horizontal surface of the formation 201.

As to the convention 215 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 215 of FIG. 2, various angles φ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 215 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 215 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 215 of FIG. 2, the dip of a plane as seen in a cross-section exactly perpendicular to the strike is true dip (see, e.g., the surface with $\phi$ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 215 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 215 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.).

Seismic interpretation may aim to identify and classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in the diagram 220 of FIG. 2, a geobody 225 may be present in a geologic environment. For example, the geobody 225 may be a salt dome. A salt dome may be a mushroom-shaped or plug-shaped diapir made of salt and may have an overlying cap rock (e.g., or caprock). Salt domes can form as a consequence of the relative buoyancy of salt when buried beneath other types of sediment. Hydrocarbons may be found at or near a salt dome due to formation of traps due to salt movement in association evaporite mineral sealing. Buoyancy differentials can cause salt to begin to flow vertically (e.g., as a salt pillow), which may cause faulting. In the diagram 220, the geobody 225 is met by layers which may each be defined by a dip angle $\phi$.

As an example, seismic data may be acquired for a region in the form of traces. In the example of FIG. 2, the diagram 220 shows acquisition equipment 222 emitting energy from a source (e.g., a transmitter) and receiving reflected energy via one or more sensors (e.g., receivers) strung along an inline direction. As the region includes layers 223 and the geobody 225, energy emitted by a transmitter of the acquisition equipment 222 can reflect off the layers 223 and the geobody 225. Evidence of such reflections may be found in the acquired traces. As to the portion of a trace 226, energy received may be discretized by an analog-to-digital converter that operates at a sampling rate. For example, the acquisition equipment 222 may convert energy signals sensed by sensor Q to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

In the example of FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc.

In the example of FIG. 2, the one or more memory storage devices 252 may store seismic data for a geologic environment that spans kilometers in length and width and, for example, around 10 km in depth. Seismic data may be acquired with reference to a surface grid (e.g., defined with respect to inline and crossline directions). For example, given grid blocks of about 40 meters by about 40 meters, a 40 km by 40 km field may include about one million traces. Such traces may be considered 3D seismic data where time approximates depth. As an example, a computer may include a network interface for accessing seismic data stored in one or more of the storage devices 252 via a network. In turn, the computer may process the accessed seismic data via instructions, which may be in the form of one or more modules.

As an example, one or more attribute modules may be provided for processing seismic data. As an example, attributes may include geometrical attributes (e.g., dip angle, azimuth, continuity, seismic trace, etc.). Such attributes may be part of a structural attributes library (see, e.g., the attribute component 130 of FIG. 1). Structural attributes may assist with edge detection, local orientation and dip of seismic reflectors, continuity of seismic events (e.g., parallel to estimated bedding orientation), etc. As an example, an edge may be defined as a discontinuity in horizontal amplitude continuity within seismic data and correspond to a fault, a fracture, etc. Geometrical attributes may be spatial attributes and rely on multiple traces.

As mentioned, as an example, seismic data for a region may include one million traces where each trace includes one thousand samples for a total of one billion samples. Resources involved in processing such seismic data in a timely manner may be relatively considerable by today's standards. As an example, a dip scan approach may be applied to seismic data, which involves processing seismic data with respect to discrete planes (e.g., a volume bounded by discrete planes). Depending on the size of the seismic data, such an approach may involve considerable resources for timely processing. Such an approach may look at local coherence between traces and their amplitudes, and therefore may be classified in the category of "apparent dip."

Figure 3:
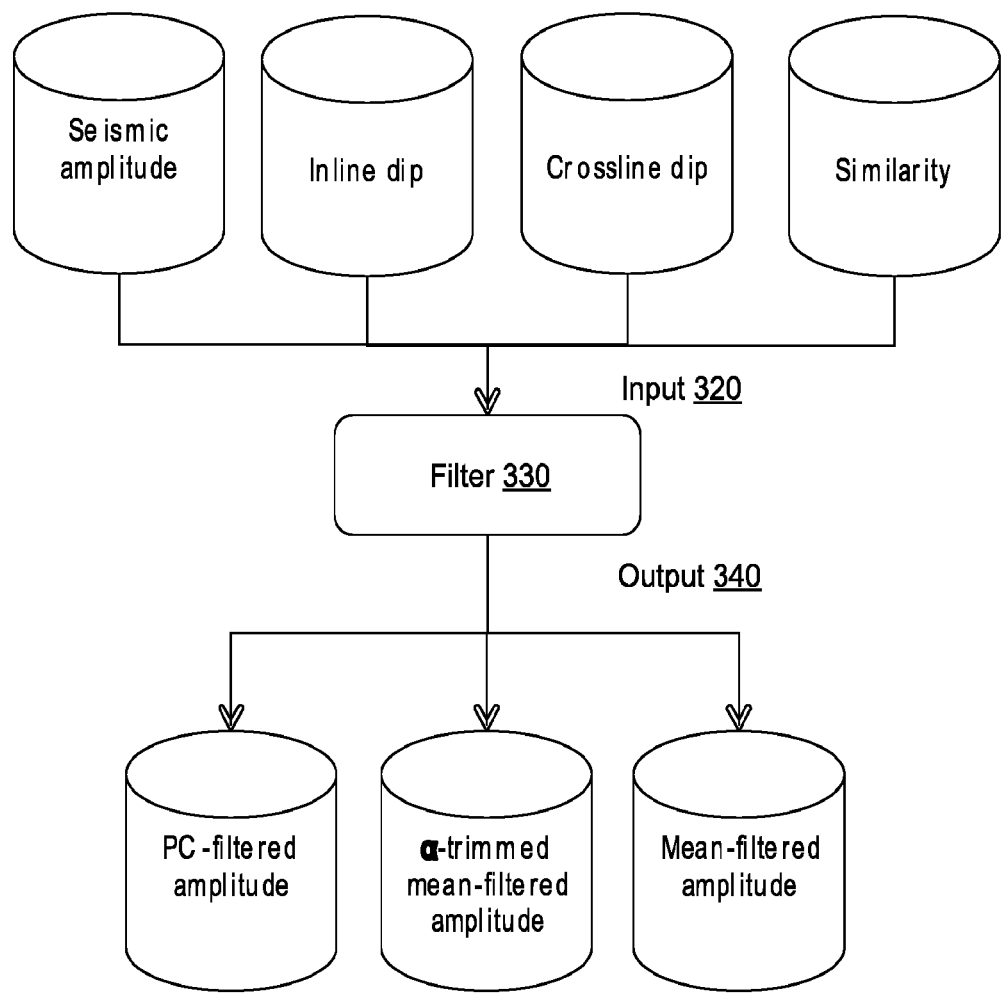
FIG. 3 illustrates an example of a method.

FIG. 3 shows an example of a method 310 that includes structure-oriented filtering of post-stack data, for example, via a program "sof3d" (Attribute Assisted Seismic Processing & Interpretation (AASPI), University of Oklahoma). As shown, the method 310 includes an input block 320, a filter block 330 and an output block 340. As shown, inputs of the input block 320 can include seismic amplitude (e.g., or other attribute to be smoothed such as velocity or impedance), the inline and crossline estimates of reflector dip (e.g., as computed from a dip program) and a measurement of similarity (e.g., as computed from a similarity program). In the method 310, the inline and crossline estimates of dip may have been previously filtered using an image filtering program (e.g., image_filt3d). Furthermore, the seismic amplitude data may have been subjected to a previous pass through structure-oriented filtering or may have been spectrally balanced. As shown, outputs of the output block 340 can include principal component—(also called Karhunen-Loève, or KL-) alpha-trimmed-mean-, or mean-filtered versions of the input seismic amplitude data. In the method 310, after volumetric estimates of dip and azimuth are generated, simple filters that reject random noise and that preserve edges can be applied (e.g., edge-preserving structure oriented filtering).

As an example, a filtering technique may be applied without implementing dip-steering (i.e. as may be applied parallel to seismic reflectors in a 3D image). In such an example, a workflow may be performed that includes filtering without calculating structural dips, which may be compute-expensive, particularly to achieve determine accurate structural dips. Further, calculated dips, as mentioned above, are estimated dips, and tend to include errors particularly close to genuine discontinuities (e.g., one or more of faults, unconformities, salt boundaries, channel edges) in a seismic image. Where dip-steering is implemented, dip estimates can bias a filter. Such an approach may generate misleading results, for example, where a wrong dip is followed, particularly across a fault as to a horizon, etc.

As an example, a filtering technique may include applying a multidimensional filter and a multidimensional parametric function (e.g., z(x,y)). In such an example, there may be a number of fixed degrees of freedom. In such an example, the filtering technique may be applied to 2D or 3D post-stack seismic data. For example, such an approach may be applied as to one or more of inline slices, cross-line slices, time-slices, horizon-slices and other types of slices.

As an example, a 2D filter approach may implement a 2nd degree polynomial, z(x,y) in two dimensions. As an example, such an approach may be applied to 2D or 3D post-stack seismic data. For example, such an approach may be applied as to one or more of inline slices, cross-line slices, time-slices, horizon-slices and other types of slices.

As to a 2nd degree polynomial, it may be applied for calculating a least-squares fit in a selected number of 2D windows (e.g., of size m*n samples/pixels) in a 2D image (e.g., of size M*N samples/pixels). For example, consider, as an example, the following 2nd degree polynomial set forth as a polynomial function:

$$z(x,y)=a*x^2+b*y^2+c*x*y+d*x+e*y+f \qquad (1)$$

where x is a position in a first dimension and y is position in a second dimension, and z(x,y) is the estimated value of the polynomial function at a location (x,y) in a 2D space.

As an example, the foregoing second order polynomial approach may be applied in a least-squares fitting scheme for attenuating noise in a seismic image or seismic images (e.g., optionally including an attribute image or attribute images). As an example, a method can include filtering individual 2D time-slices (e.g., or depth-slices, if the seismic data has been depth-migrated) in a 3D seismic cube independently. As an example, a method can include determining a value for the parameter "f" in the equation (1) as presented above.

As an example, a method can include selecting a window size or window sizes and optionally window shape or shapes. As an example, a method can include running several windows of different sized and/or shape. In such an example, a result may be selected to utilize for a particular set of data, a particular feature to be highlighted (e.g., enhanced as to signal-to-noise, etc.), a particular type of noise to be attenuated, etc.

As an example, a window may be a rectangular window. As an example, a window size may be selected based at least in part on a number of unknowns (e.g., in a polynomial). As an example, a window may include more samples than unknowns in a polynomial. As an example, consider a 3×3 window, a 3×2 window, a 2×3 window, a 33×33 window, etc. As an example, filtering may account for bin size (e.g., consider about 12.5 m×about 25 m). As an example, a window may be applied vertically, horizontally or at another angle. As an example, a sample size may be selected with respect to dimensions, optionally chosen independently as to sample rate and noise level. As an example, a window size and/or shape may be selected based at least in part on a shape and/or size of a feature and/or type of noise.

As an example, a process may aim to "connect" structures, for example, by resolving features such as ridges and/or valleys; optionally including applying one or more techniques such as, for example, ant-tracking.

As an example, a method may be applied to post-stack and/or pre-stack data. As an example, a method may include calculating dip estimates or not calculating dip estimates. As an example, as to pre-stack data, a method may be applied before migration or NMO correction. As an example, a method may be applied to common midpoint (CMP) data (e.g., gathers, etc.), optionally in set pairs, etc. As an example, a seismic survey may be an AVO, an AVA (e.g., with offsets/angles) and/or one or more other types of surveys. As an example, a survey may be a land-based and/or a sea-based survey (e.g., optionally employing streamers. As an example, a method may be applied to data prior to calculation of dip estimates. In such an example, a quality of data may be assessed and optionally utilized to characterize the data and/or dip estimates calculated therefrom (e.g., as to certainty, quality, etc.).

Figure 4:
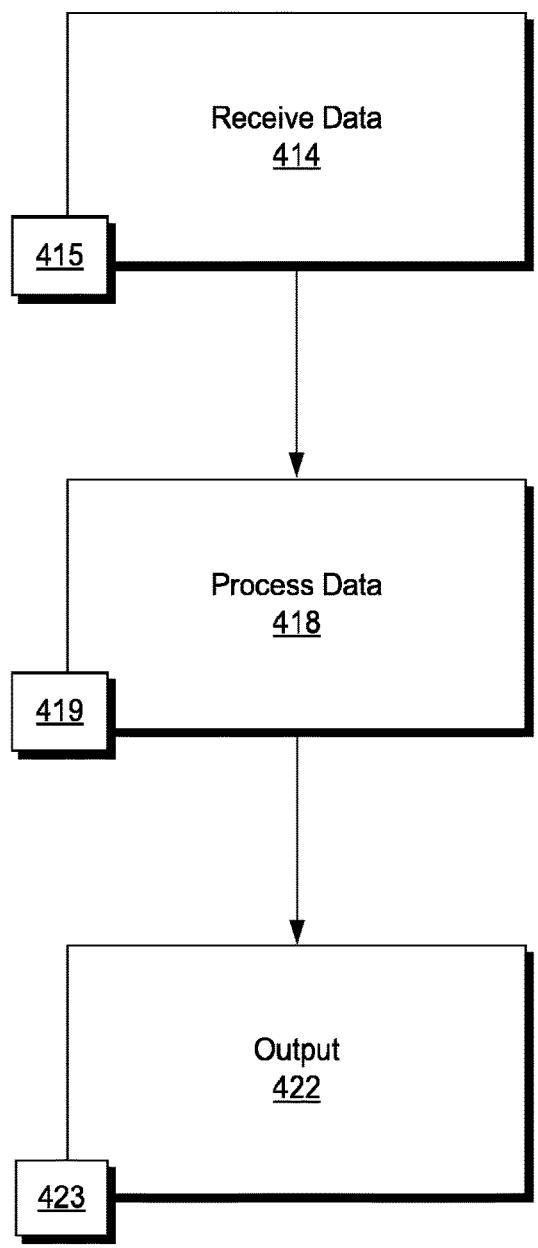
FIG. 4 illustrates an example of a method.

FIG. 4 shows an example of a method 410 that includes a reception block 414 for receiving seismic data; a process block 418 for processing at least a portion of the seismic data by fitting a multidimensional polynomial function to at least a portion of the data generate one or more values for one or more corresponding parameters of the function; and an output block 422 for outputting information (e.g., filtered data, parameter values, etc.).

As an example, the method 410 can include selecting a window size for the fitting. As an example, the method 410 can include least squares fitting of a second order multidimensional polynomial function to seismic amplitudes of a window.

As an example, a method can include receiving seismic data; fitting a multidimensional polynomial function to at least a portion of the seismic data to generate one or more values for one or more corresponding parameters of the function; and, based at least in part on the fitting, outputting information.

Figure 5:
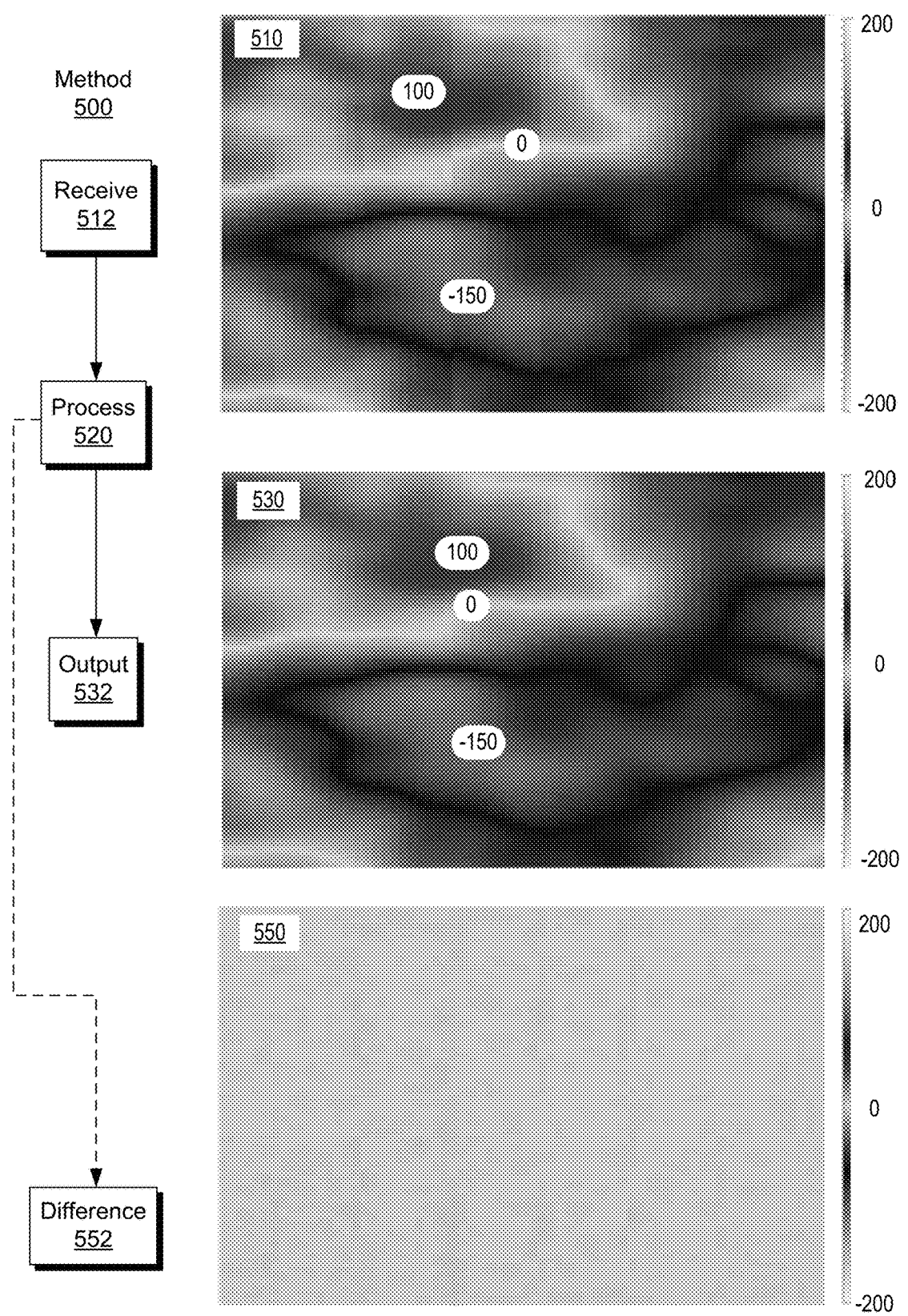
FIG. 5 illustrates an example of a method.

FIG. 5 shows an example of a method 500 that includes a reception block 512, a process block 520 and an output block 532 as well as an optional difference block 552. For example, data 510 may be received per the reception block 512, processed per the process block 520 and data 530 may be output per the output block 532. In such an example, difference data 550 between the data 510 and 530 may be stored, analyzed, rendered to a display, etc. Such difference data may represent at least in part an amount of noise removed (e.g., attenuated).

The method 500 of FIG. 5 can act to attenuate noise, for example, in 2D and/or 3D seismic images. The data 510 is a 2D time-slice image extracted from a 3D post-stack seismic cube that includes relatively straight lines, which are acquisition footprints (e.g., from seismic data acquisition and processing to arrive at the data 510).

Figure 6:
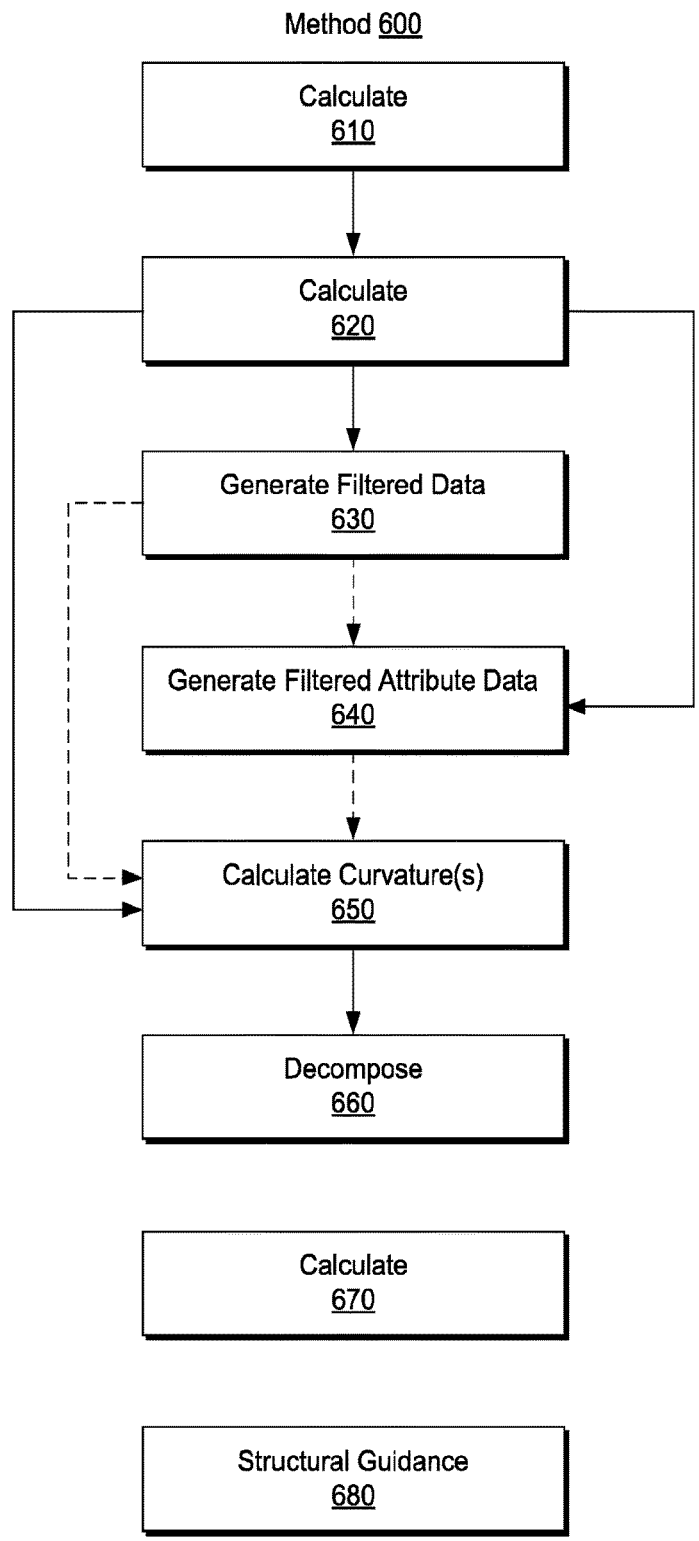
FIG. 6 illustrates an example of a system.

FIG. 6 shows an example of a method 600 that includes blocks 610, 620, 630, 640, 650, 660, 670 and 680. As an example, a workflow may include performing an action or actions of one or more of the blocks of the method 600 of FIG. 6.

As an example, the block 610 can be a calculation block for calculating a least-squares fit in 2D windows (of size m*n samples/pixels) in a 2D image (of size M*N samples/pixels) to an example polynomial function of the form (equation 1 as set forth above and represented for convenience below):

$$z(x,y)=a*x\textasciicircum 2+b*y\textasciicircum 2+c*x*y+d*x+e*y+f \quad (1)$$

where x is position in the first dimension and y is position in second dimension, and z(x,y) is the estimated value of the polynomial function at location (x,y) in 2D space.

In such an example, the least-squares approximation may be performed, for each window in the image, by first defining a [6×1] coefficient vector x:

$$x^T=[abcdef] \quad (2)$$

Such a process may then include defining a [p×1] sample/pixel vector y, containing p=m*n sample values z1, z2, . . . , zp in the 2D window, such as:

$$y^T=[z_1 z_2 \ldots z_p] \quad (3)$$

The process can then include defining a [p×6] matrix A, where the values in A can be set as follows:

$$A[i,1]=x_i^2 \quad (4)$$

$$A[i,2]=y_i^2 \quad (5)$$

$$A[i,3]=x_i*y_i \quad (6)$$

$$A[i,4]=x_i \quad (7)$$

$$A[i,5]=y_i \quad (8)$$

$$A[i,6]=1.0 \quad (9)$$

where i=1 . . . p, $x_i$ is the signed distance between the location of sample #i and the center point of the window in the first (x) direction, and $y_i$ is the signed distance between the location of sample #1 and the center point of the window in the second (y) direction.

In the foregoing example, it is implied that the window size p is to be equal or larger than 6. This is because at least six equations are to be considered to resolve the six unknown parameters in the vector x.

If p=6, then consider the following relationship:

$$y=Ax \quad (10)$$

The foregoing implies that if A is invertible (and it will be, if at least three samples in each direction, i.e. m>=3 and n>=3), then the process can include finding the coefficients in x, for example, as:

$$x=A^{-1}y \quad (11)$$

If p>6 then the system is an overdetermined system (i.e., more equations than unknowns). One example approach to resolve x in this situation is to estimate it in a least-squares sense. For example, consider finding x as follows:

$$x=By \quad (12)$$

where B is a [6×6] matrix, defined as:

$$B=(A^T A)^{-1} A^T \quad (13)$$

Note that if the window size and sample spacing in both directions is common for all windows in the image, then B is invariant (i.e. it does not change as a process moves the window around in the image), and can hence be calculated once. Such an approach may be a "Moore-Pentrose pseudoinverse approach", which may efficiently calculate x as the trivial convolution of B and y (eq. 12).

As an example, the block 620 of the method 600 can be another calculation block. For example, with inverted polygon parameters $x^T$=[a bcdef], the calculation block 620 can include calculating estimated (and hence filtered) values at one or more locations in a window using eq. 1. For example, consider calculating the filtered value z' for a center sample/pixel in each window as follows:

$$z'=z(0,0)=f \quad (14)$$

In such a manner, the method 600 may include constructing a filtered image by, for each sample/pixel in the image, extracting a window of samples around it, invert for z', and set z' as the filtered value for that location in the image.

As an example, the calculation block 620 may optionally implement a 2D Savitzky-Golay filter, for example, as explained above (see, e.g., S-G filter above).

The aforementioned approach (e.g., of blocks 610 and 620) may be part of a 2D filter approach that uses one or more types of parametric function z(x,y), with a particular fixed degrees of freedom. As an example, the block 630 of the method 600 of FIG. 6 can be a generation block for generating filtered data. For example, information derived from the blocks 610 and 620 may be applied, for example, to 2D or 3D post-stack seismic data (e.g., inline slices, cross-line slices, time-slices, horizon-slices or other). As an example, such an approach may be applied, for example, to pre-stack seismic data. As an example, an approach may be applied to data to generate filtered data where the approach attenuates noise in the data that can include footprint acquisition noise. In such an example, the filtered data may be relatively free of one or more types of noise.

As an example, a 2D filter approach may include the aforementioned particular 2nd degree polynomial, given as $z(x,y)$, in two dimensions in eq. 1. Such an approach may be applied to 2D or 3D post-stack seismic data (e.g., inline slices, cross-line slices, time-slices, horizon-slices or other) and/or to pre-stack seismic data.

Various trials demonstrate that the aforementioned filter approach, using that particular polynomial form (eq. 1) for the least-squares fitting, can be efficient and can attenuate noise in seismic images. As an example, consider applying such an approach by filtering one or more 2D time-slices (e.g., or depth-slice, if the seismic data has been depth-migrated) in a 3D seismic cube, for example, independently.

Referring again to the method 500 of FIG. 5, the data 530 corresponds to the data 510, the seismic 2D image, after filtering, using 9×9 samples window size; notice that the particular straight lines in the image have been attenuated. Evidence of such lines is visible in the difference data 550, which is the estimated, and hence attenuated, noise between the input image (data 510) and the filtered image (data 530) in FIG. 5. Note that the estimated noise does include linear features associated with acquicition/processing, plus a bit of estimated random noise. The linear features dominate the difference data 550 and there is little correlation between the input image (data 510) and the noise of the difference data 550, adding confidence to the result.

Figure 7:
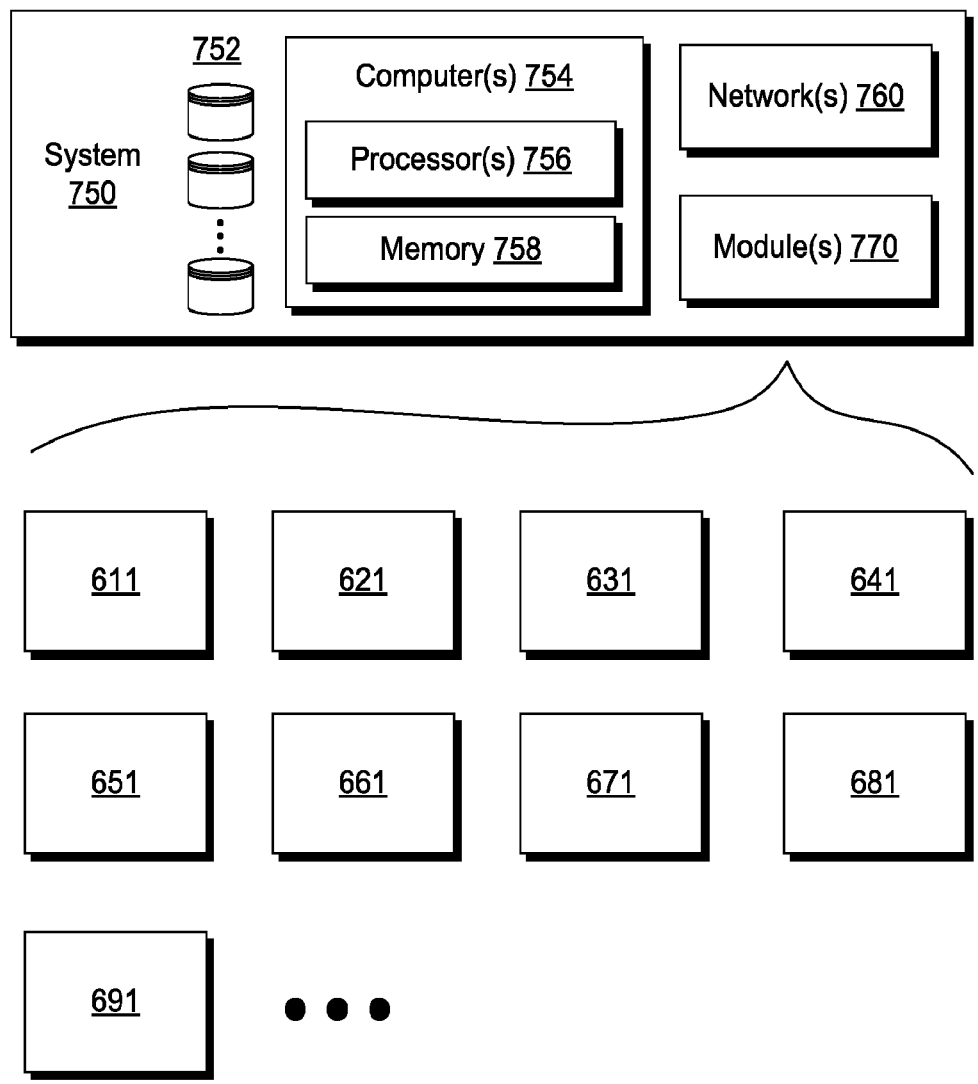
FIG. 7 illustrates an example of a method with respect to data.

FIG. 7 shows an example of a system 750 that includes one or more information storage devices 752, one or more computers 754, one or more networks 760 and one or more modules 770. As to the one or more computers 754, each computer may include one or more processors (e.g., or processing cores) 756 and memory 758 for storing instructions (e.g., modules), for example, executable by at least one of the one or more processors. As an example, a computer may include one or more network interfaces (e.g., wired or wireless), one or more graphics cards, a display interface (e.g., wired or wireless), etc. In the example of FIG. 7, the one or more memory storage devices 752 may store seismic data for a geologic environment.

As an example, a system can include one or more processors for processing information; memory operatively coupled to the one or more processors; and modules that include instructions stored in the memory and executable by at least one of the one or more processors. As shown in the example of FIG. 7, such modules may include modules that correspond to one or more of the blocks of the example method 600 of FIG. 6, labeled as 611, 621, 631, 641, 651, 661, 671 and 681. As an example, one or more other modules may be included as indicated by the block 691. As an example, a system may include an ant-tracking module for generating ant track data. As an example, a system may include a fracturing module, for example, to perform one or more calculations, tasks, etc. associated with fracturing. As an example, a system may include one or more modules, which may be provided to analyze data, control a process, perform a task, perform a workstep, perform a workflow, etc.

FIG. 8 shows equations 800 and plots 810 and 820 while FIG. 9 shows equations 900. The equations 800 and 900 and the plots 810 and 820 may be found in Roberts, A. (2001), Curvature attributes and their application to 3D interpreted horizons (First Break, 19: 85-100. doi: 10.1046/j.0263-5046.2001.00142.x), which is incorporated by reference herein. Referring to the polynomial at the top of FIG. 9 (see, e.g., Roberts at equation 6), the approach mentioned above differs from that of Roberts as to how coefficients are calculated (see, e.g., Roberts at equations 7 to 12, which are reproduced in FIG. 9, below the polynomial).

As explained in Roberts, the parametric function is to calculate a series of structural curvature attributes, which can be derived from the coefficients a-b-c-d-e; noting that the coefficient "f" is not used in Roberts; whereas, as explained above, it may be utilized as part of a filtering technique (see, e.g., blocks 630 and/or 640 of the method 600 of FIG. 6).

With reference to FIG. 6, the block 650 can be a calculation block for calculating one or more curvatures (e.g., one or more curvature attributes). For example, as the method 600 can include calculating coefficients for the parametric function (see, e.g., the polynomial at the top of FIG. 9) from seismic amplitude data (e.g., rather than from elevation data as in Roberts), the method 600 can optionally include calculating one or more of the curvature attributes set forth in Robert (e.g., and/or one or more other curvature attributes). As an example, a method can include calculating curvature attributes that are not strictly structural attributes but that are rather "pseudo" curvature attributes which can be named "Amplitude Curvature" attributes (see, e.g., block 630) and, for example, "Edge Curvature" attributes (see, e.g., block 640).

While the term Amplitude Curvature is mentioned above, there is another use of this term, which may be more appropriately referred to as "Energy Curvature" because it involves first calculating the energy level in a whole 3D cube (e.g. using a vertical Root-Mean-Squared operator), then calculating the inline and cross-line gradients of the energy level, and finally using those two gradient volumes to estimate constants a, b and c, and assume that d, e and f are all zero; where robustness is via spatially filtering the energy level cube before the gradients are calculated.

As an example, a method can include calculating one or more curvature attributes in a "pseudo" sense, for both amplitude 3D input seismic data and edge (e.g., or one or more other attributes derived from seismic data) 3D input data. As to some examples of curvature attributes, consider the following:

Kmax (Roberts, 2001, eq. 17)
Kmin (Roberts, 2001, eq. 18)
Shape Index (Roberts, 2001, eq. 25)
Curvedness (Roberts, 2001, eq. 26)
Dip Angle (Roberts, 2001, eq. 13)
Azimuth of max curvature (Roberts, 2001, eq. 14)

As an example, the block 660 of FIG. 6 may be a decomposition block. For example, where the method 600 can provide approximate shape and azimuthal direction of features in seismic amplitude data, or in seismic attribute data, the method 600 may include decomposing the input volumes based on one or more of, for example, curvedness, shape and/or azimuth direction, and/or one or more other attributes (e.g., including one or more expressions including one or more of the constants a-f in the parameter vector x), as calculated from the input data, etc.

As an example, a method that may include one or more of the following:

Highlight karst structures in edge attributes (e.g., where they will have shape index close to +1.0);

Extract fault lineaments from the edge attributes (e.g., where they will have shape index close to +0.5);

Extract fault lineaments in a particular azimuth direction (e.g., filter on curvature azimuth and shape index); and Remove lineaments which are likely to be acquisition footprints (e.g., where they will have azimuth close to the inline/sail angle).

As an example, the block 670 of FIG. 6 may be a calculation block that can include calculating one or more seismic attributes from noise-attenuated 2D and/or 3D seismic data (e.g., or seismic attribute data). As an example, an attribute may capture one or more properties of seismic data which previously were not available. For example, consider an ability to quickly calculate the azimuth of major and minor faults. As an example, consider running one or more regressions (e.g. correlations, neural-net mappings, unsupervised and/or supervised classification) between one or more attributes and/or other types of data, like wireline measurements along a borehole, etc.

As an example, the block 680 may be a structural guidance block that may implement, for example, structural steering. As an example, consider structural steering of a filter (e.g., as in the method 600). As an example, a method may include comparing filtering with and without structural guidance.

FIGS. 10 and 11 show examples of equations. Such equations may be employed, for example, in a method such as the method 600 of FIG. 6 (e.g., in the block 610).

As an example, a method can include receiving seismic data; fitting a multidimensional polynomial function to at least a portion of the seismic data to generate one or more values for one or more corresponding parameters of the function; and, based at least in part on the fitting, outputting information. In such an example, the method can include receiving seismic data that includes seismic amplitude data where the fitting includes fitting the multidimensional polynomial function to the seismic amplitude data. As an example, seismic data may be or include seismic attribute data.

As an example, a method can include generating filtered seismic data based at least in part on fitting of a multidimensional polynomial function to seismic data. As an example, a method can include generating curvature attribute data based at least in part on fitting of a multidimensional polynomial function to seismic data.

As an example, a multidimensional polynomial function can include a number of parameters as unknowns and fitting can include utilizing a window size that encompasses a number of samples of seismic data that is equal to or greater than the number of parameters.

As an example, a multidimensional polynomial function can be a two-dimensional polynomial function. As an example, a multidimensional polynomial function can include six parameters as unknowns. As an example, a multidimensional polynomial function can be: $z(x,y)=a*x^2+b*y^2+c*x*y+d*x+e*y+f$.

As an example, a function may be specified in a Cartesian coordinate system and/or in another type of coordinate system (e.g., cylindrical, etc.).

As an example, a method can include generating filtered seismic data based at least in part on filtering to attenuate acquisition footprint noise in seismic data.

As an example, seismic data may be a seismic volume (e.g., a seismic cube). As an example, a method can include performing fitting on a plurality of 2D slices of seismic data, optionally independently. In such an example, a method may include performing fitting in parallel and/or in series using one or more processor cores. As an example, a method can include least-squares fitting.

As an example, a system can include one or more processors for processing information; memory operatively coupled to the one or more processors; and modules that include instructions stored in the memory and executable by at least one of the one or more processors, where the modules include a reception module that receives seismic data; a fitting module that fits a multidimensional polynomial function to at least a portion of the seismic data generate one or more values for one or more corresponding parameters of the function; and an output module that, based at least in part on fitting, outputs information. In such an example, the fitting module can be or include a least-squares fitting module.

As an example, one or more computer-readable storage media can include computer-executable instructions to instruct a computing system where the instructions include instructions to: receive data wherein the data includes seismic data or seismic attribute data; fit a multidimensional polynomial function to at least a portion of the data to generate one or more values for one or more corresponding parameters of the function; and output information. In such an example, the output information can include filtered data. As an example, seismic data can include seismic amplitude data where fitting fits a function to at least a portion of the seismic amplitude data.

As an example, a method can include determining a shape likelihood, which may be based, for example, at least in part on characteristic information for a particular feature. As an example, such a method can include determining a degree of truth as to a shape. As an example, a method can include determining a directional shape likelihood. As an example, a method can include determining a 3D shape likelihood. As an example, a method can include classifying multi-dimensional features (e.g., objects, phenomena, etc.) based at least in part on directional shape likelihoods.

Figure 12:
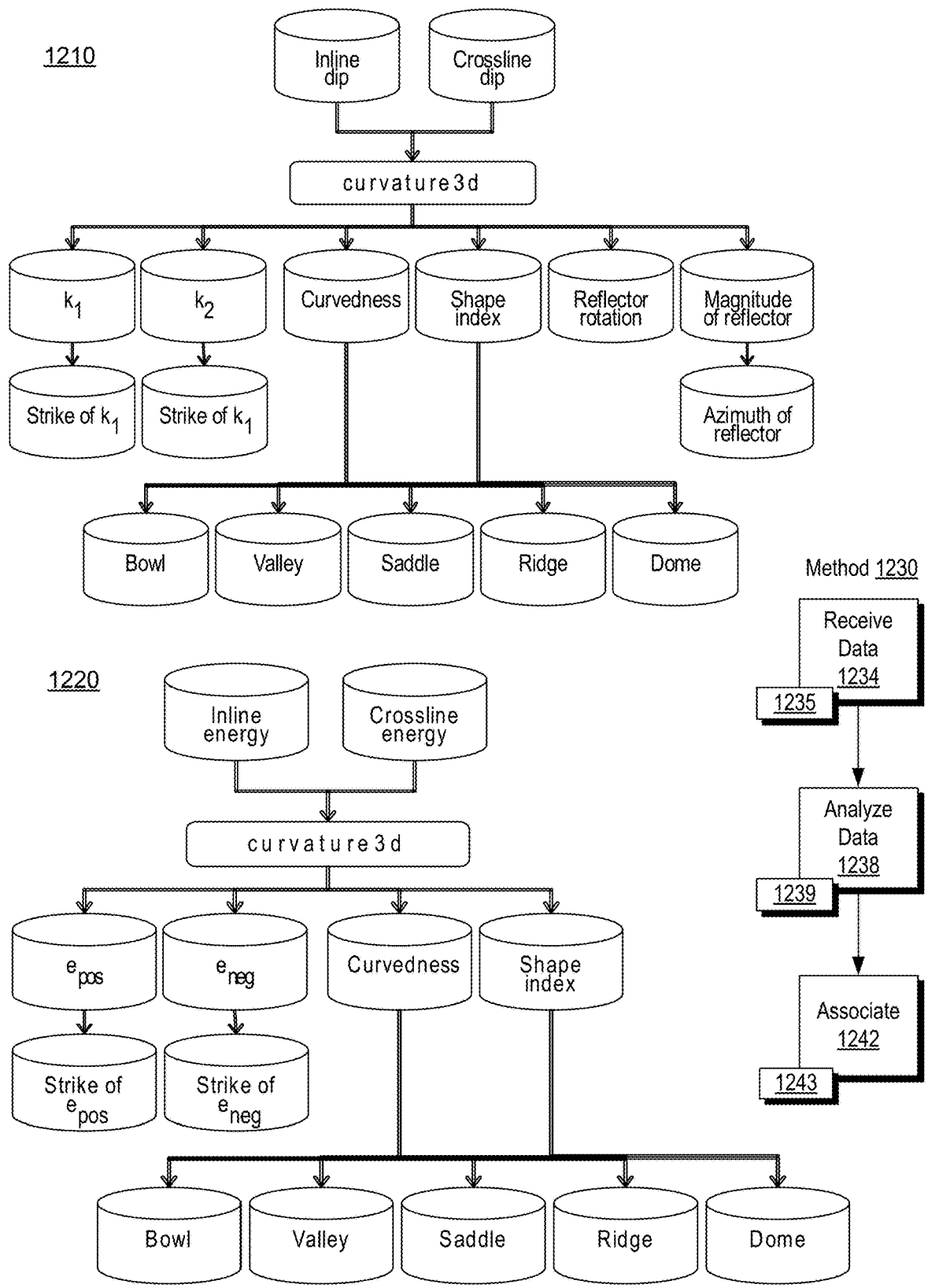
FIG. 12 illustrates examples of workflows and an example of a method.

FIG. 12 shows two workflows 1210 and 1220 that can include classifying, along with a method 1230, which may be a workflow, part of a workflow, in part, part of a workflow. The workflow 1210 pertains to structural curvature and the workflow 1220 pertains to amplitude curvature. As an example, a workflow may include one or more aspects of the workflow 1210 and/or the workflow 1220. As an example, a workflow can include implementing fuzzy logic, for example, via membership functions for features as may be represented via feature indexes, for example, along a feature index spectrum.

In FIG. 12, the method 1230 includes a reception block 1234 for receiving n-dimensional data where n is equal at least three; an analysis block 1238 for analyzing a plurality of two-dimensional slices of the n-dimensional data to determine characteristic information with respect to a plurality of feature indexes for a feature in the n-dimensional data; and an association block 1242 for, based at least in part on the characteristic information, associating the feature with one of the feature indexes.

The method 1230 is shown in FIG. 12 in association with various computer-readable media (CRM) blocks 1235, 1239 and 1243. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1230. As an example, a computer-readable medium (CRM) may be a computer-readable storage medium that is not a carrier wave and non-transitory (i.e., not a signal).

As an example, a shape index (SI) can have a value in a range from −1.0 to +1.0 where a geometrical interpretation of SI is as follows:
SI=−1.0: a bowl shape
SI=−0.5: a valley shape
SI=0.0: a flat shape
SI=+0.5: a ridge shape
SI=+1.0: a dome shape As an example, shape index values between the values above can indicate that the shape is somewhere between the shapes listed above. So, for example, a shape index of 0.75 may indicate that a shape is in the middle between a ridge and a dome, and hence may have a "cigar" shape.

As an example, for an image, a method may calculate the curvature and shape index of each pixel in the image and possibly segment the image into features, for example, through thresholding of the SI and curvature estimates. Such an approach may operate without a sufficient level of discrimination or attention to the uncertainty of the segmentation of the pixels. As an example, a fuzzy logic approach may be implemented, for example, as part of a feature detection framework. As an example, a fuzzy logic approach may be implemented to detect features that may be multi-dimensional. As an example, consider a method that can map objects in 3D images/datasets.

As an example a workflow can include various operations, which may be performed at least in part in sequence and/or, where suitable, in part in parallel.

As an example, consider the following Shape Likelihood (SL) function, which can be valid for 2D data:

$$SL(f,SI)=1-2*MIN(\frac{1}{2},|f-SI|)$$

In the foregoing example, SI is a pre-calculated shape index value for a given pixel/sample/element in a 2D matrix, and the parameter f is a feature value in the real value range −1.0 to +1.0. The term |f−SI| gives the absolute value of the difference between f and SI. And, MIN is the minimum function, which in this case can return the smaller value of ½ and the absolute value of the difference between f and SI.

As an example, SL values can be in the real range [0.0, +1.0], and SL(f,SI)==1.0 if (exclusively), SI is equal to f. As an example, given the foregoing equations, where SL(f,SI)=0.0, then the difference between f and SI is at least about 0.5. The function SL can indicate the likelihood that a given shape index value SI is of the desired shape value f.

In a workflow involving the foregoing equations, the following may be defined, for example, as derived particular feature functions:

Dome Likelihood(SI)=SL(+1.0,SI)

Line Likelihood(SI)=SL(+0.5,SI)

Flat Likelihood(SI)=SL(0.0,SI)

Trough Likelihood(SI)=SL(−0.5,SI)

Bowl Likelihood(SI)=SL(−1.0,SI)

In the above, the intention is that, for example, the function LineLikelihood(SI) should indicate the likelihood that any given 2D point, with a calculated shape index SI, is actually a point in a continuous 2D line feature/object in the 2D space.

As an example, a workflow can include calculate at least some of the foregoing shape/feature likelihoods for orthogonal 2D intersections through a 3D dataset. As an example, given a 3D dataset (for instance a 3D image, or a 3D seismic cube, or any attribute data calculated e.g. from a 3D seismic cube), then a method may include extracting X intersections, Y intersections, and Z intersections, and calculating the shape likelihood for such orthogonal planes independently.

Figure 13:
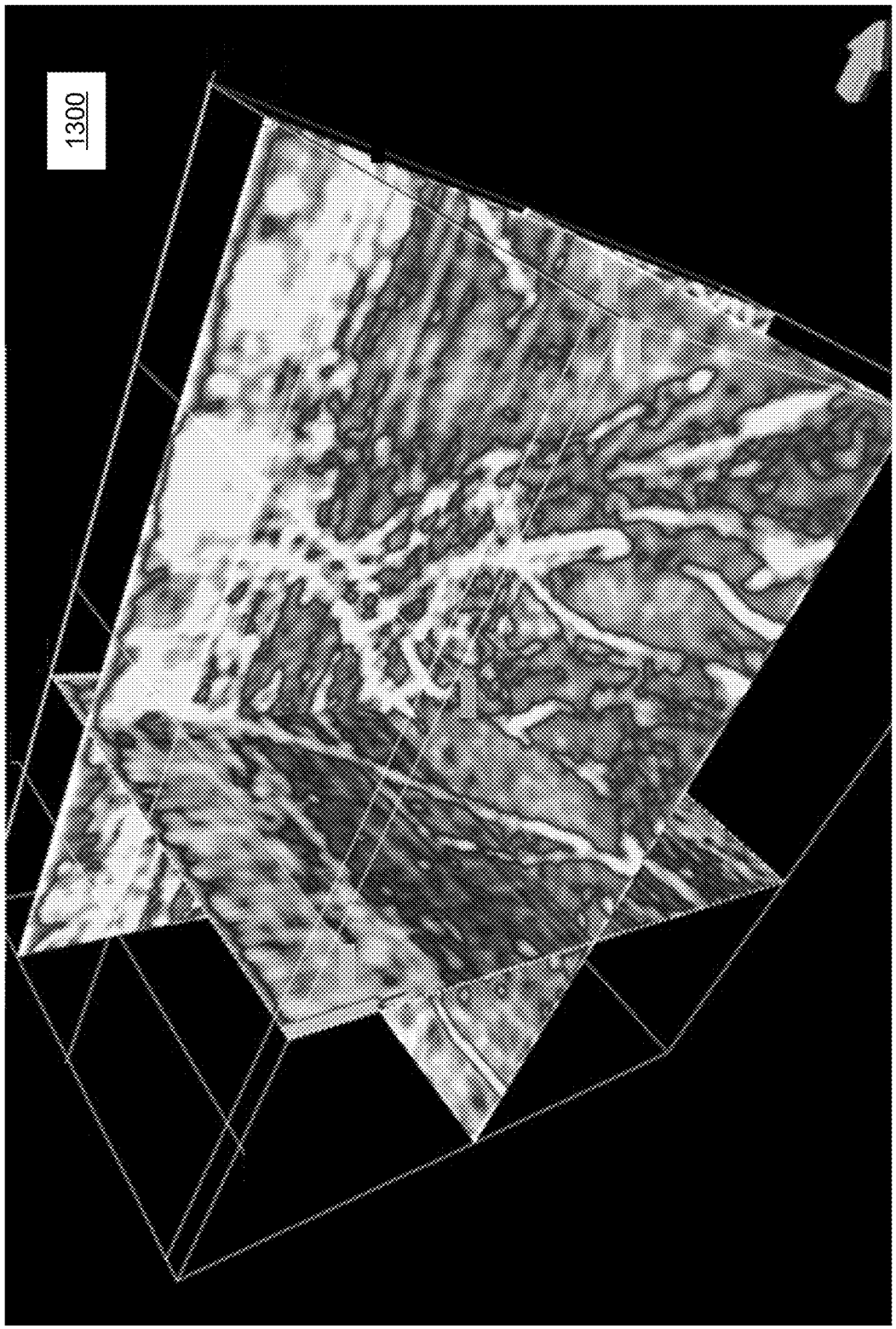
FIG. 13 illustrates an example of a plot.

FIG. 13 shows an example plot 1300 with three orthogonal 2D intersecting planes through a 3D image. In such an example, if the input 3D data are a 3D post-stack seismic cube, then the three orthogonal planes can be referred to as the inline (IL) planes, the cross-line (XL) planes and the vertical (Z) planes.

As an example, consider defining the following derived particular function:

$$SL(f,SI,d)=SL(f,SI(d)); \text{ where SI is calculated along the 2D plane } d$$

In such an example, the Shape Index SI can be calculated along the orthogonal 2D plane d through the 3D dataset. Another way of looking at this is to say that the Shape index SI now is a vector, and that the function SL hence now also is a vector function.

As an example, a method can include extending feature functions (e.g. the LineLikelihood function) defined above to also contain the dimensionality/direction parameter d. For example, consider calculating the likelihood that a 3D point p in a 3D image is a line point in the first, second or third dimension (note that such an extension may be generalized to work for one or more n-dimensional spaces, where n>=2).

FIG. 14 shows a series of plots 1400 that include input 3D Edge seismic attribute, displayed for one 2D inline intersection, in upper left image, together with its associated likelihood for being a cup (upper right image), line (lower left image) or flat (lower right image) 2D shape. The point at the cursor location is more likely to be a cup (p=0.66) than a line (p=0.34). Note that the likely linear features can be either "steeply dipping" or "nearly horizontal".

FIG. 15 shows a series of plots 1500 where the same input 3D data as in FIG. 14 is utilized, but now plotted along a 2D time/depth slice intersection, together with the corresponding shape likelihood functions, but now calculated in the direction of the input 2D time-slice intersection.

As an example, a method can include providing a defined set of 2D directional likelihood functions, for example, based on input 3D data. As an example, such a method can also include implementing a framework to perform combinatorial reasoning, for example, based on these individual independent directional likelihood functions.

As an example, consider a method that implements a Fuzzy Logic computational framework. In such an example, the method may utilize the following fuzzy logical operators:

$$a \text{ mAND } b=MIN(a,b) \quad (\text{Eq. \#1})$$

$$a \text{ mOR } b=MAX(a,b) \quad (\text{Eq. \#2})$$

$$a \text{ AND } b=a*b \quad (\text{Eq. \#3})$$

$$a \text{ OR } b=1-(1-a)*(1-b) \quad (\text{Eq. \#4})$$

$$\text{NOT } a=!a=1-a \quad (\text{Eq. \#5})$$

Note that these fuzzy logical operators can take as input one (e.g., the "NOT" function) or two likelihood variables, and return one new likelihood variable (e.g., which has the real value range [0.0, 1.0]). In such an example, note that a whole set of commonly used likelihood functions (e.g., NEITHER, NAND, XOR, etc.) can be formally derived from the fundamental basis functions defined above, in a manner such as composed Boolean logic (e.g., Boolean algebra).

As an example, consider the following example operations of Boolean logic:

And (conjunction), denoted $x\hat{}y$ (sometimes $x$ AND $y$ or $Kxy$), satisfies $x\hat{}y=1$ if $x=y=1$ and $x\hat{}y=0$ otherwise.

Or (disjunction), denoted $x\backslash/y$ (sometimes $x$ OR $y$ or $Axy$), satisfies $x\backslash/y=0$ if $x=y=0$ and $x\backslash/y=1$ otherwise.

Not (negation), denoted $\neg x$ (sometimes NOT $x$, $Nx$ or $!x$), satisfies $\neg x=0$ if $x=1$ and $\neg x=1$ if $x=0$.

As an example, a method can include creating a number of new likelihood variables, for example, based on given input variables. For example, consider, as an example, the likelihood that a 3D point is linear both laterally (e.g., along a 2D time/depth intersection) and along the vertical inline direction:

$$p.\text{IsInline2DPlane}=p.\text{Horizontal.IsLine } m\text{AND } p.\text{Inline.isLine} \quad (\text{Eq. \#6})$$

FIG. 16 shows a series of plots 1600 for an input 3D Edge seismic attribute, displayed for one 2D lateral intersection, in upper left image, together with its associated likelihood for being line laterally (upper right image), its associated likelihood of being a line in the inline direction (lower left image), and finally the likelihood of being a 2D inline plane (lower right image) as defined by equation #6.

As an example, a seismic interpreter may aim to map 2D fault planes in 3D seismic images as efficiently as possible. Although such fault planes may be gently curved, they can be locally planar in shape. This means that (non-parallel) 2D intersection of such 2D objects in 3D space can appear to be linear in each intersection plane. As an example, consider expressing that particular selection criteria within a logical framework with the following formula:

$$p.\text{Is2DPlane}=p.\text{Horizontal.IsLine } m\text{AND} \\ (p.\text{Inline.isLine } m\text{AND } p.\text{Xline.isLine}) \quad (\text{Eq. \#7})$$

FIG. 17 shows a series of plots 1700 for input 3D Edge seismic attribute to the left, and detected points likely to belong to a 2D plane (according to eq. #7) displayed to the right. The points are color-coded with the likelihood that that they belong to a 2D plane.

As an example, consider an alternative formulation, based on the AND operator:

$$p.\text{Is2DPlane}=p.\text{Horizontal.IsLine } \text{AND} \\ (p.\text{Inline.isLine AND } p.\text{Xline.isLine}) \quad (\text{Eq. \#8})$$

FIG. 18 shows a series of plots 1800 for Input to the left, result according to eq. #8 to the right.

As an example, a slightly more relaxed formula can be implemented via the following example equation, where mOR is utilized rather than mAND between the two vertical likelihood variables:

$$p.\text{Is2DPlane}=p.\text{Horizontal.IsLine } m\text{AND} \\ (p.\text{Inline.isLine } m\text{OR } p.\text{Xline.isLine}) \quad (\text{Eq. \#9})$$

FIG. 19 shows a series of plots 1900 for Input to the left, result according to eq. #9 to the right.

As an example, edge attributes may be sensitive to a multitude of discontinuities in 3D seismic data. As an example, a most common discontinuity is faults. Another source of discontinuities of interest to geoscientists can be channel boundaries. Such features tend to be characterized by being reasonably linear laterally, but with relatively little vertical continuity (i.e., being not likely to be a cup shape when investigated in the inline or cross-line planes). This can, for example, be expressed by the following example equation:

$$p.\text{IsChannelEdge}=p.\text{Horizontal.IsLine } m\text{AND} \\ (p.\text{Inline.isCup } m\text{OR } p.\text{Xline.isCup}) \quad (\text{Eq. \#10})$$

FIG. 20 shows a series of plots 2000 for Lateral slice through likelihood of being a lateral line (i.e. p.Horizontal.IsLine) in upper left image. Corresponding likelihood of being a cup in inline vertical direction (i.e. p.Inline.isCup) to the bottom left, and likelihood of being a cup in crossline direction (i.e. p.Xline.isCup) to the bottom right. Result, according to eq. #10 in the upper right image.

The result in FIG. 20 may be enhanced, for example, via logic that may supplement or otherwise differ from that of equation #10. For example, more complex logic or logics may be applied. As an example, consider a channel that does not necessarily have a cup shape in vertical intersections. It may also have a cigar or linear shape, because the vertical intersections are quite likely not to be completely orthogonal to the channels. But, the linear shapes may be more or less horizontal, and not very vertical, as that is more an indicator of a fault discontinuity.

As an example, a method can include use other likelihood variables than the aforementioned example Shape Index. For example, consider one or more other types of indexes (e.g., feature indexes) that may be appropriately quantified in one or more dimensions. Such an approach may optionally be implemented to further discriminate features in a 3D dataset.

As an example, consider one or more approaches that consider one or more of amplitude, curvature and direction.

FIG. 21 shows a series of plots 2100 for Inline vertical section of attribute Amplitude in upper left image. Estimated principal $K_1$ curvature in upper right image. Shape Index in lower left image, and estimated line angle (in this vertical case: inline dip angle) for linear features in lower right image. In FIG. 19, it can be seen that the linear feature at the cursor location is dipping at about 41 degrees (from vertical), and has a shape index of about 0.29 which can indicate that the point at the cursor is most likely to be a fault line segment. In FIG. 19, it can be noted how the curvature highlights contrasting attribute amplitude values (e.g., when compared to neighbors).

As an example, Fuzzy Logic may be implemented. For example, consider specifying a condition where angles beyond 70 degrees (e.g., relative to vertical axis) are near horizontal and that the closer to 90 degrees, the more horizontal it is. For example, consider the following example formula:

$$\text{isHorizontalLineAngle}=\text{MAX}(0,(\text{angle}-Ac)/(90-Ac)) \quad (\text{Eq. \#11})$$

In the foregoing equation, Ac can be a chosen cut-off angle when defining the horizontal direction. The foregoing equation is linear in nature. As an example, an equation may be linear or non-linear. As an example, consider a non-linear equation that will progressively approach 1.0 as the line angle approaches 90 degrees.

As an example, a method can implement a likelihood estimation for another scalar attribute (e.g. amplitude or curvature) and, for example, include this in a fuzzy logic formulation. For example, consider:

$$p.\text{isHorizontalLine} = p.\text{isLine} \quad m\text{AND} \quad p.\text{isHorizontalAngle} \quad \text{(Eq. #12)}$$

As an example, a method may include implementing one or more enhancement techniques. For example, consider utilizing operator size (e.g., scale space) to further discriminate 2D objects (e.g., 2D features) in one or more images. Consider the following examples: IsThickLine, IsThickPlane.

As an example, a method can include use of one or more other seismic attributes (e.g., other than edge indicators) as input to a logical framework. For example, consider one or more of RMS amplitude, spectral decomposition, etc., which may highlights geo-bodies (e.g., rather than geo-edges) in 3D seismic data.

As an example, a method may utilize context information when calculating likelihoods. For example, consider use of one or more background trends, use of counting of neighbors with similar properties, etc.

FIG. 22 shows various examples of equations 2200 that pertain to curvature.

Figure 23:
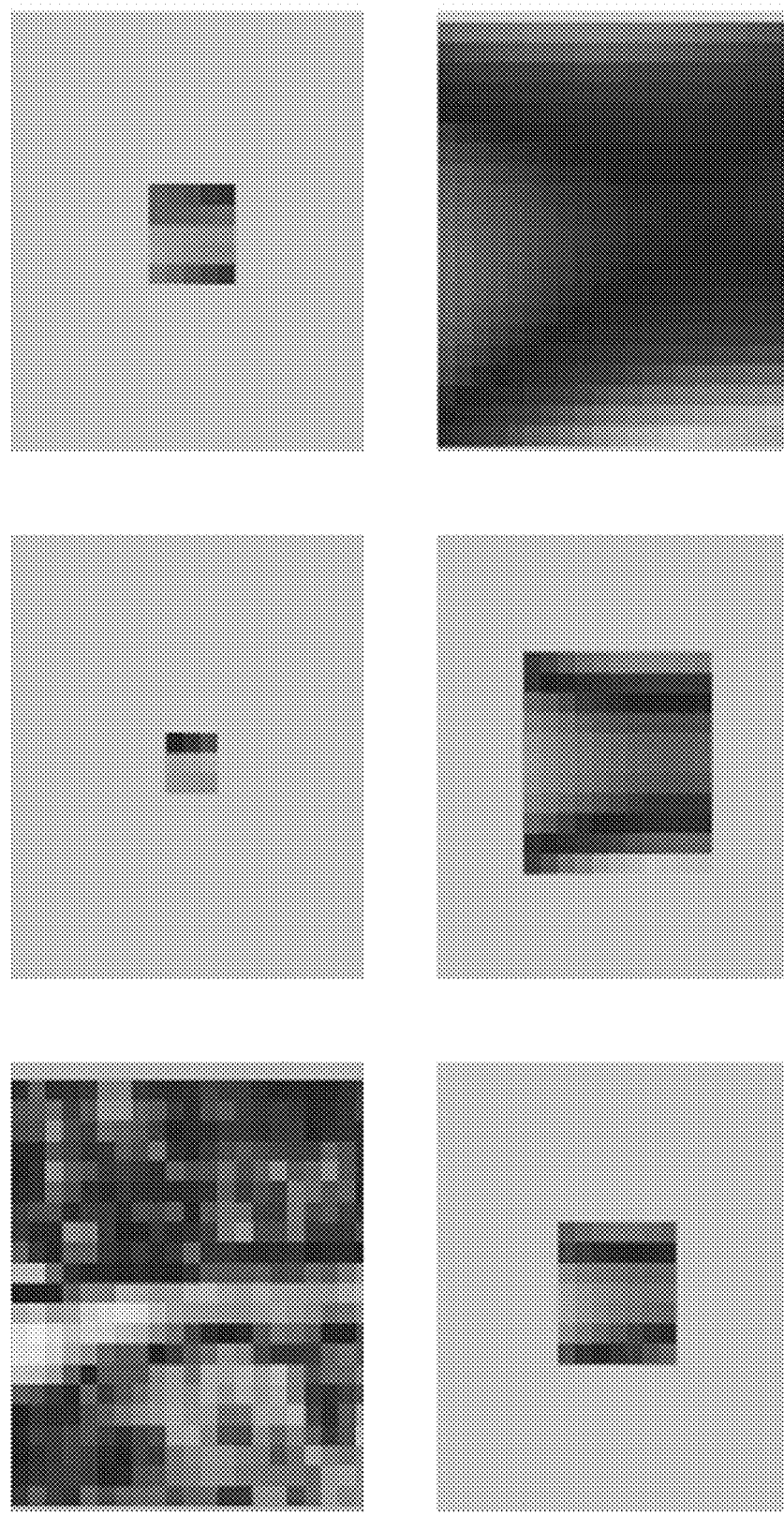
FIG. 23 illustrates an example of a series of plots.

FIG. 23 shows a series of plots 2300 of fitted surfaces.

FIG. 24 shows a series of plots 2400 of residuals that correspond to the plots 2300 of FIG. 23.

FIG. 25 shows a series of plots 2500 that include input, a surface in three-dimensional space and the surface integrated into the input. The plots 2500 show how a surface may be detected and utilized in combination with at least a portion of input data. As an example, such a surface may be implemented for modeling, visualization, etc.

FIG. 26 shows example plots 2600 pertaining to curvedness and shape index.

Figure 27:
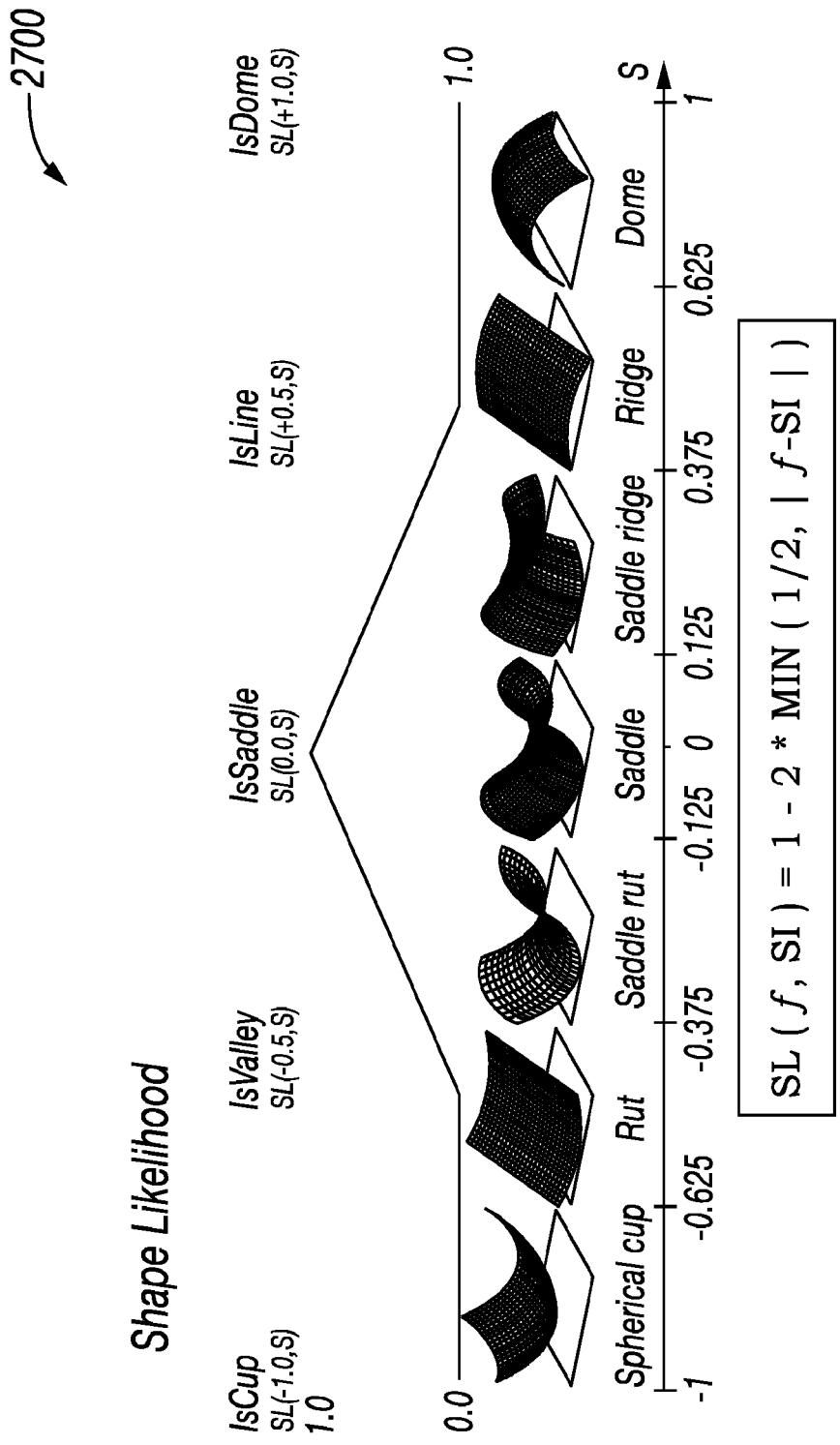
FIG. 27 illustrates an example of a function.

FIG. 27 shows an example of a function 2700 with respect to shape index. Such a function may be a fuzzy logic function, for example, a membership function that can provide characteristic information. As an example, a function may be provided for a plurality of the shapes of the shape index. As an example, a function may be provided for each of the shapes shown in the example of FIG. 27.

FIG. 28 shows a series of plots 2800 that includes a shape function plot and corresponding plots for "IsCup", "IsValley", "IsSaddle", "IsLine" and "IsDome". Further, plots are shown for Azimuth Angle and "Azimuth Angle WHERE "IsLine>0.5". As shown in FIG. 28, various types of logic may be applied to associate a feature with a feature index. As an example, a feature may be associated with a datum or data. For example, a feature may be a voxel in a volume data set or may be a set of voxels in a volume data. In such an example, a feature index may be associated with the voxel or a set of voxels of a volume data set.

As an example, a method can attenuate various types of noise in 3D seismic images, for example, without implementing dip-steering of a filter. As an example, a method can include calculating various shape and curvature attributes. As an example, a method can include decomposing data into separate architectural elements based on, for example, shape, direction and curvature attributes. As an example, a method can include performing analytics for data of different types (e.g., seismic and wireline, etc.). As an example, a method can include least-squares fitting of parametric function. For example, consider fitting to attenuate noise and then calculating one or more attributes based at least in part on parametric function. As an example, a method can implement fuzzy reasoning.

As an example, a method may include a texture index, for example, to characterize textures.

As an example, a method may implement a multi-core processor, which may be, for example, a GPU.

As an example, a method may implement machine learning (e.g., AI, etc.), for example, to recognize features in data.

As an example, a method may include identifying a hot zone, a leakage zone, a cold zone, etc. For example, consider a thermal image of a structure where shapes of thermal patterns can be identified. In such an example, a method can include associating such patterns with underlying structure or structures. For example, a beam may cause a thermal pattern that differs from a window.

As an example, seismic data may be, for example, post stack seismic volumes or other type of seismic data (e.g., seismic attribute data, etc.).

As an example, data may be in the form of a multi-dimensional heat map volume where "heat" may be temperature or representative of another type of parameter (e.g., magnetism, pressure, an attribute, etc.).

As an example, a method can include identifying a structure that produces a type of shape, for example, to assist in distinguishing information in data. As an example, data may be IR data, tomography data (e.g., CT, MR, etc.). As an example, features may be or include channels. As an example, features may be or include blood vessels (e.g., brain, skin, eye/retina, lung, or other organ). As an example, features may be or include branching structures within an object (e.g., the Earth, a body, etc.).

As an example, a function may be linear or non-linear. As an example, a function can include a Gaussian shape, optionally weighted.

As an example, a method can include processing two 2D slices and detecting a 3D feature. As an example, a neighborhood size as to scale of structures may be utilized. As an example, an aperture may be utilized. As an example, a domain size may be implemented as to least square polynomial fitting (e.g., scale controlled via aperture, number of points, etc.).

As an example, data may be subjected to spatial deformation or transformation. For example, consider stretching data in a certain spatial direction to make a feature with an aspect ratio other than 1:1 more like 1:1. Such an approach may be part of preconditioning of data.

As an example, shapes can be primitive shapes. As an example, primitive shapes may be selected based on a priori knowledge of a feature or features in data. As an example, a feature may be representable via a combination of primitive shapes.

As an example, a method can include receiving n-dimensional data where n is equal at least three; analyzing a plurality of two-dimensional slices of the n-dimensional data to determine characteristic information with respect to a plurality of feature indexes for a feature in the n-dimensional data; and, based at least in part on the characteristic information, associating the feature with one of the feature indexes. In such an example, the analyzing can include applying fuzzy logic. As an example, each of the feature indexes can have a corresponding function. As an example, characteristic information can be membership information where a feature index can be associated with a membership function.

As an example, a feature may be a feature selected from a group of, for example, chemical features, structural features, electromagnetic features, temperature features, and fluid features.

As an example, n-dimensional data can include or be seismic data, can be or include radiologic data, and/or can be or include image data.

As an example, a method can include associating a feature and its feature index with a structural feature. In such an example, n-dimensional data can include data of a three-dimensional environment where, for example, a structural feature exists within the three-dimensional environment.

As an example, n-dimensional data can be or include data of a three-dimensional environment.

As an example, a method can include utilizing a plurality of scale operator sizes and/or shapes.

As an example, a method can include utilizing amplitude, curvedness, direction and/or angle.

As an example, a method can include utilizing contextual information.

As an example, a method can include rendering information to a display. For example, consider a method that includes receiving n-dimensional data where n is equal at least three; analyzing a plurality of two-dimensional slices of the n-dimensional data to determine characteristic information with respect to a plurality of feature indexes for a feature in the n-dimensional data; and, based at least in part on the characteristic information, associating the feature with one of the feature indexes. In such an example, the feature may be rendered to a display. For example, consider a computing device that performs such a method at least in part via execution of processor-executable instructions where the computing device can be operatively coupled to a display to render information thereto. As an example, such a method may be part of an interpretation workflow (e.g., for seismic interpretation and/or other type of image/data interpretation).

As an example, a method can include feature index-based feature detection. As an example, a system can include instructions to perform feature index-based feature detection.

As an example, a system can include one or more processors; memory operatively coupled to at least one of the one or more processors; and instructions stored in the memory and executable by at least one of the one or more processors to instruct the system to receive n-dimensional data where n is equal at least three; analyze a plurality of two-dimensional slices of the n-dimensional data to determine characteristic information with respect to a plurality of feature indexes for a feature in the n-dimensional data; and, based at least in part on the characteristic information, associate the feature with one of the feature indexes.

As an example, one or more computer-readable storage media can include computer-executable instructions to instruct a computing system where the instructions can include instructions to: receive n-dimensional data wherein n is equal at least three; analyze a plurality of two-dimensional slices of the n-dimensional data to determine characteristic information with respect to a plurality of feature indexes for a feature in the n-dimensional data; and, based at least in part on the characteristic information, associate the feature with one of the feature indexes.

Figure 29:
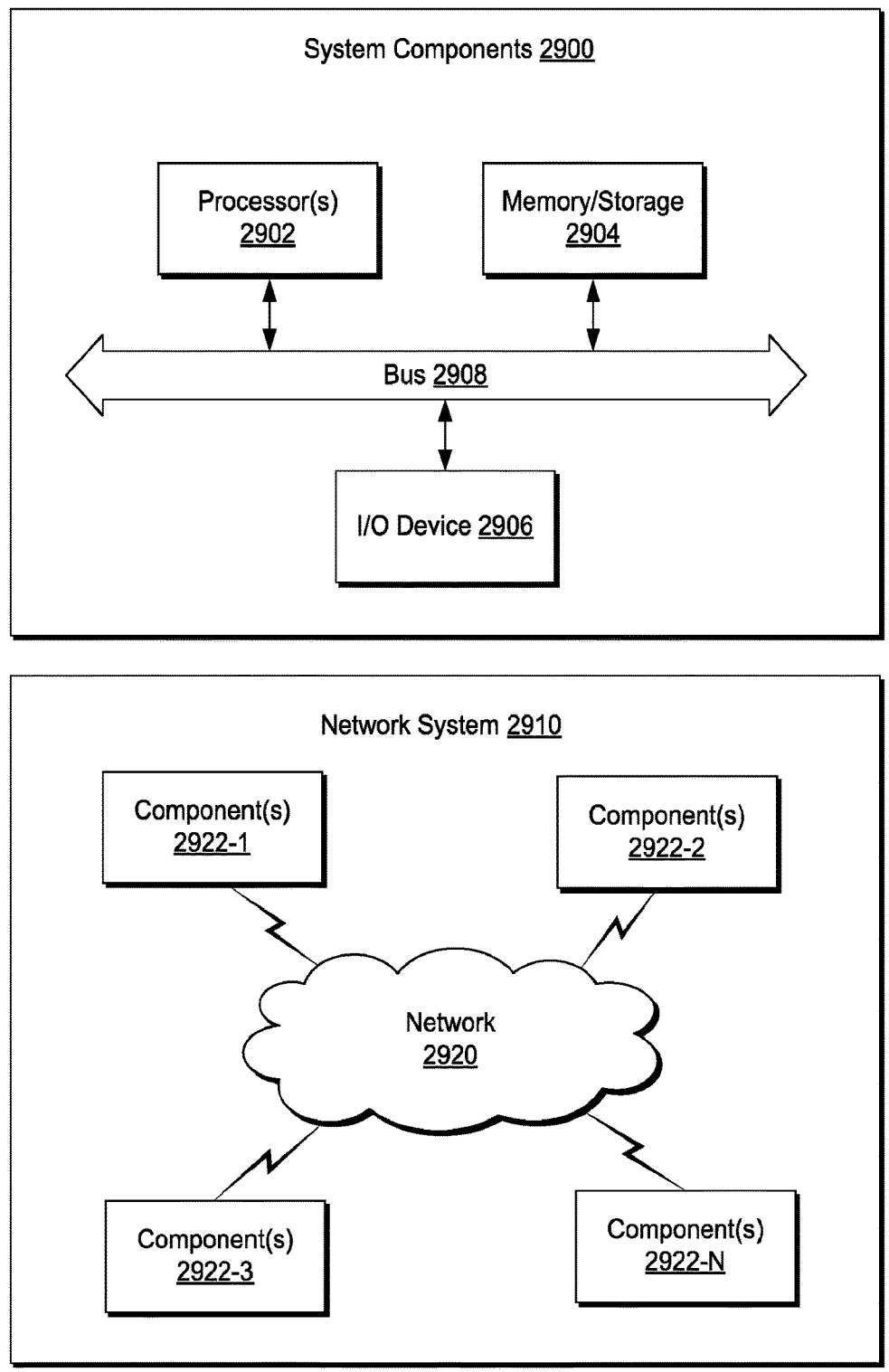
FIG. 29 illustrates example components of a system and a networked system.

FIG. 29 shows components of an example of a computing system 2900 and an example of a networked system 2910. The system 2900 includes one or more processors 2902, memory and/or storage components 2904, one or more input and/or output devices 2906 and a bus 2908. In an example embodiment, instructions may be stored in one or more computer-readable media (e.g., memory/storage components 2904). Such instructions may be read by one or more processors (e.g., the processor(s) 2902) via a communication bus (e.g., the bus 2908), which may be wired or wireless. The one or more processors may execute such instructions to implement (wholly or in part) one or more attributes (e.g., as part of a method). A user may view output from and interact with a process via an I/O device (e.g., the device 2906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2910. The network system 2910 includes components 2922-1, 2922-2, 2922-3, . . . 2922-N. For example, the components 2922-1 may include the processor(s) 2902 while the component(s) 2922-3 may include memory accessible by the processor(s) 2902. Further, the component(s) 2902-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving n-dimensional data for a subterranean geologic environment wherein n is equal to at least three, wherein the n-dimensional data comprise sensor-based data;
analyzing points in a plurality of two-dimensional slices of the n-dimensional data using a feature shape likelihood function to determine at least one feature shape likelihood for each of the points with respect to a plurality of specified feature shape values for corresponding characteristic feature shapes; and
based at least in part on the feature shape likelihoods, associating a plurality of the points with one of the characteristic feature shapes wherein the plurality of the points correspond to a feature in the subterranean geologic environment that physically characterizes the subterranean geologic environment.

2. The method of claim 1 wherein the feature shape likelihood function depends on a difference between a calculated feature shape value and one of the specified feature shape values.

3. The method of claim 2 wherein the calculated feature shape value defines a local surface shape independent of scale.

4. The method of claim 1 comprising, based at least in part on a portion of the plurality of the points, rendering a representation of at least a portion of the feature to a display.

5. The method of claim 1 wherein the feature shape likelihoods comprise feature shape likelihoods for multiple scales.

6. The method of claim 1 wherein the feature shapes comprise one of amplitude feature shapes, curvedness feature shapes, direction feature shapes or angle feature shapes.

7. The method of claim 1 wherein the two-dimensional slices comprise at least a first series of two-dimensional slices along a first dimension and a second series of two-dimensional slices along a second dimension wherein at least a portion of the points comprise a first feature shape likelihood associated with the first series and a second feature shape likelihood associated with the second series.

8. The method of claim 7 wherein the second dimension is orthogonal to the first dimension.

9. The method of claim 1 wherein each of the points comprises a feature shape likelihood vector.

10. The method of claim 9 wherein the feature shape likelihood vector depends on feature shape values for corresponding orthogonal two-dimensional planes.

11. The method of claim 1 comprising analyzing at least one of the points using fuzzy logic.

12. The method of claim 11 wherein the analyzing comprises multidimensional analysis of a point based on at least two feature shape likelihoods for the point.

13. The method of claim 1 wherein the n-dimensional data comprise seismic data.

14. The method of claim 1 wherein the n-dimensional data comprise image data.

15. The method of claim 1 comprising utilizing a plurality of scale operator sizes.

16. The method of claim 1 comprising utilizing contextual information.

17. The method of claim 1 comprising simulating physical phenomena using a multidimensional model of the subterranean geologic environment that comprises a representation of the feature.

18. A system comprising:
one or more processors;
memory operatively coupled to at least one of the one or more processors; and
instructions stored in the memory and executable by at least one of the one or more processors to instruct the system to
receive n-dimensional data for a subterranean geologic environment wherein n is equal to at least three, wherein the n-dimensional data comprise sensor-based data;
analyze points in a plurality of two-dimensional slices of the n-dimensional data using a feature shape likelihood function to determine at least one feature shape likelihood for each of the points with respect to a plurality of specified feature shape values for corresponding characteristic feature shapes; and
based at least in part on the feature shape likelihoods, associate a plurality of the points with one of the characteristics feature shapes wherein the plurality of the points correspond to a feature in the subterranean geologic environment that physically characterizes the subterranean geologic environment.

19. The system of claim 18 comprising a display and instructions stored in the memory and executable by at least one of the at least one processor to, based at least in part on a portion of the points, render a representation of at least a portion of the feature to the display.

20. One or more computer-readable storage media comprising computer-executable instructions to instruct a computing system wherein the instructions comprise instructions to:
receive n-dimensional data for a subterranean geologic environment wherein n is equal to at least three, wherein the n-dimensional data comprise sensor-based data;
analyze points in a plurality of two-dimensional slices of the n-dimensional data using a feature shape likelihood function to determine at least one feature shape likelihood for each of the points with respect to a plurality of specified feature shape values for corresponding characteristic feature shapes; and
based at least in part on the feature shape likelihoods, associate a plurality of the points with one of the characteristic feature shapes wherein the plurality of the points correspond to a feature in the subterranean geologic environment that physically characterizes the subterranean geologic environment.

* * * * *